(12) United States Patent
Kim et al.

(10) Patent No.: US 7,237,939 B2
(45) Date of Patent: Jul. 3, 2007

(54) BACKLIGHT ASSEMBLY AND LIQUID CRYSTAL DISPLAY APPARATUS USING THE SAME

(75) Inventors: Kyu-Seok Kim, Yongin (KR); Ik-Soo Lee, Suwon (KR)

(73) Assignee: Samsung Electronics Co., Ltd. (KR)

( * ) Notice: Subject to any disclaimer, the term of this patent is extended or adjusted under 35 U.S.C. 154(b) by 263 days.

(21) Appl. No.: 10/504,613

(22) PCT Filed: Feb. 20, 2003

(86) PCT No.: PCT/KR03/00348

§ 371 (c)(1),
(2), (4) Date: Aug. 13, 2004

(87) PCT Pub. No.: WO03/089980

PCT Pub. Date: Oct. 30, 2003

(65) Prior Publication Data

US 2005/0117368 A1    Jun. 2, 2005

(30) Foreign Application Priority Data

Apr. 16, 2002    (KR) ............................... 2002-20568
Nov. 19, 2002    (KR) ...................... 10-2002-0072040

(51) Int. Cl.
*G09F 13/18* (2006.01)
(52) U.S. Cl. ...................... 362/616; 362/620; 362/626; 362/628; 40/546; 40/572

(58) Field of Classification Search ................ 362/612, 362/615, 617, 621, 623, 561, 616, 620, 626, 362/628; 349/61; 385/129; 40/546, 572
See application file for complete search history.

(56) References Cited

U.S. PATENT DOCUMENTS

| | | | |
|---|---|---|---|
| 4,693,560 A | | 9/1987 | Wiley .......................... 350/335 |
| 5,283,968 A | * | 2/1994 | Williams ...................... 40/546 |
| 5,390,436 A | * | 2/1995 | Ashall .......................... 40/546 |

(Continued)

FOREIGN PATENT DOCUMENTS

EP    0 881 617 A1    12/1998

(Continued)

OTHER PUBLICATIONS

PCT International Preliminary Examination Report of International Application No. PCT/KR2003/000348; International Filing Date Feb. 20, 2003; date of submission of the demand Nov. 12, 2003.

*Primary Examiner*—Jong Suk Lee
*Assistant Examiner*—Ismael Negron
(74) *Attorney, Agent, or Firm*—Cantor Colburn LLP

(57) ABSTRACT

A backlight assembly includes a light guide plate for emitting a light in two directions and a brightness control member for controlling the brightness ratio of the light emitting in the two directions. An LCD apparatus including first and second LCD panels, displays images in the two directions, with individual brightnesses which are similar to one another or different from one another depending on the brightness control member.

26 Claims, 27 Drawing Sheets

U.S. PATENT DOCUMENTS

| | | | |
|---|---|---|---|
| 5,521,797 A * | 5/1996 | Kashima et al. | 362/617 |
| 5,640,792 A * | 6/1997 | Smith et al. | 40/546 |
| 5,641,219 A * | 6/1997 | Mizobe | 362/623 |
| 6,002,829 A * | 12/1999 | Winston et al. | 385/129 |
| 6,471,388 B1 * | 10/2002 | Marsh | 362/559 |
| 6,494,593 B2 * | 12/2002 | An et al. | 362/249 |
| 6,674,496 B2 * | 1/2004 | Wei | 349/65 |
| 6,741,301 B2 * | 5/2004 | Tsuji | 349/65 |
| 6,981,791 B2 * | 1/2006 | Higashiyama | 362/600 |
| 2003/0063456 A1 * | 4/2003 | Katahira | 362/27 |
| 2004/0008506 A1 * | 1/2004 | Son | 362/31 |

FOREIGN PATENT DOCUMENTS

| | | |
|---|---|---|
| GB | 2 247 977 A | 3/1992 |
| JP | 9-243988 | 9/1997 |

* cited by examiner

BACKLIGHT ASSEMBLY AND LIQUID CRYSTAL DISPLAY APPARATUS USING THE SAME

BACKGROUND OF THE INVENTION

1. Field of the Invention

The present invention relates to a backlight assembly and an LCD (Liquid Crystal Display) apparatus, and more particularly to a backlight assembly for emitting a light in multiple directions, capable of displaying image information in two directions different to each other and an LCD apparatus having the same.

2. Description of the Related Art

In general, an LCD apparatus displays an image using a liquid crystal in which a light transmittance varies with an intensity of an electric field. The LCD apparatus has a flat shape having a thickness from a number of millimeters to dozens of millimeters including a liquid crystal layer that a thickness is no more than a number of micrometers.

The LCD apparatus is widely used as a communication device such as a cellular phone and as a display device such as a mobile computer or a desktop computer and so on.

The LCD apparatus employing a method that displays the image in only one direction had been developed to reduce a thickness and a volume thereof. Recently, the LCD apparatus has been developed to display a same image or a different image in two directions.

In order to display the image in the two directions, the LCD apparatus includes a reflecting plate for dividing the light into the two directions and an LCD panel having a polarizing filter, a pixel electrode, a liquid crystal, two electrodes facing each other, a glass substrate, a polarizing plate. The LCD apparatus further includes a flat type light emitting part for emitting the light in opposite two directions and a display cell disposed on both surfaces of the light emitting part. The LCD apparatus further includes a backlight assembly, a first LCD panel and a second LCD panel disposed on both surfaces of the backlight assembly, respectively.

The LCD apparatus divides the light so as to display the image in the opposite two directions, however, the LCD apparatus cannot control the intensity of the light divided into the opposite two directions.

As an example of a display device which needs to control the intensity of die light, a cellular phone having an external display device and an internal display device will be described. For example, if a cellular phone of model "A" has an external display device having a brightness lower than that of an internal display device thereof, most of lights emitted from a light source are provided to the internal display device. Also, if a cellular phone of model "B" has an external display device having a brightness higher than that of an internal display device thereof, most of lights emitted from the light source are provided to the external display device.

As aforementioned above, the LCD apparatus may divide the light into the opposite two directions, however, the LCD apparatus may not variably control the amount of the light divided into the opposite two directions according to an external situation.

BRIEF SUMMARY OF THE INVENTION

The present invention provides a backlight assembly capable of dividing a light into two lights having a different brightness and supplying the divided lights in two directions.

The present invention also provides an LCD having a backlight assembly capable of dividing a light into two lights having a different brightness and displaying images same or different to each other in two directions.

In one aspect of the invention, there is provided a backlight assembly for emitting a light in two directions, comprising: a light guide plate having a light incident surface for changing a first light input from between a first display area and a second display area into a second light, a lust light emitting surface for emitting a portion of the second light to the first display area as a third light and a second light emitting surface for emitting a remained portion of the second light to the second display area as a fourth light, the light guide plate being disposed between the first and second display areas; and a brightness control part for reflecting a portion of the fourth light to the first display area and transmitting a remained portion of the fourth light to the second display area, so that a first brightness at the first display area and a second brightness at the second display area have a predetermined brightness ratio, respectively.

In another aspect, there is provided a backlight assembly for emitting a light in two directions, comprising: a lamp assembly disposed between a first display area and a second display area, for providing a first light and a fifth lights between the first and second display areas, the first and fifth lights having a path different to each other; a first light guide plate having a first light incident surface for changing the first light into a second light, a first surface for reflecting a portion of the second light to the first display area as a third light and a second surface for emitting the third light, the second surface being faced to the first surface; a second light guide plate having a second light incident surface for changing the fifth light into a sixth light, a third surface for reflecting a portion of the sixth light to the second display area as a seventh light and a fourth surface for emitting the seventh light, the fourth surface being faced to the third surface; and a reflecting plate disposed between the first and third surfaces, for reflecting a remained portion of the second light leaked from the first surface to the first display area as a fourth light and reflecting a remained portion of the fifth light leaked from the third surface to the second display area as an eighth light.

In further aspect, there is provided an LCD apparatus comprising: a lamp assembly disposed between a first display area and a second display area, for providing a first light between the first and second display areas; a light guide plate having a light incident surface for changing the first light into a second light, a first light emitting surface for emitting a portion of the second light to the first display area as a third light and a second light emitting surface for emitting a remained portion of the second light to the second display area as a fourth light; a brightness control part for reflecting a portion of the fourth light to the first display area and transmitting a remained portion of the fourth light to the second display area, so that a first brightness at the first display area and a second brightness at the second display area have a predetermined brightness ratio, respectively; a first LCD panel assembly for changing the portions of the third and fourth lights into a first display light having an image information; and a second LCD panel assembly for changing the remained portion of the fourth light into a second display light having an image information.

In still another aspect, there is provided an LCD apparatus comprising: a lamp assembly disposed between a first display area and a second display area, for providing a first light and a fifth lights between the first and second display areas, the first and fifth lights having a path different to each other; a first light guide plate having a first light incident surface for changing the first into a second light, a first surface for reflecting a portion of the second light to the first display area as a third light and transmitting a remained portion of the second light to the second display area as a fourth light, and a second surface facing to the first surface, for emitting the third light; a second light guide plate having a second light incident surface for changing the fifth light into a sixth light, a third surface for reflecting a portion of the sixth light to the second display area as a seventh light and transmitting a remained portion of the sixth light to the first display area as a eighth light, and a fourth surface facing to the third surface, for emitting the seventh light; a reflecting plate disposed between the first and third surfaces, for reflecting a remained portion of the second light leaked from the first surface to the first display area as a fourth light and reflecting a remained portion of the fifth light leaked from the third surface to the second display area as an eighth light; a first LCD panel assembly for generating a first display light having an image information using the third and fourth lights; and a second LCD panel assembly for generating a second display light having an image information using the seventh and eight lights.

According to the backlight assembly for the LCD apparatus, the light from the light source is divided into a light for the first display area and a light for the second display area of the LCD apparatus. The portion of the light provided to the second display area is reflected to the first display area and the remained portion of the light provided to the second display area is transmitted, thereby controlling the brightness ratio at the first and second display areas. Thus, it is able to display a required image in the two directions.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION OF THE INVENTION

Figure 1:
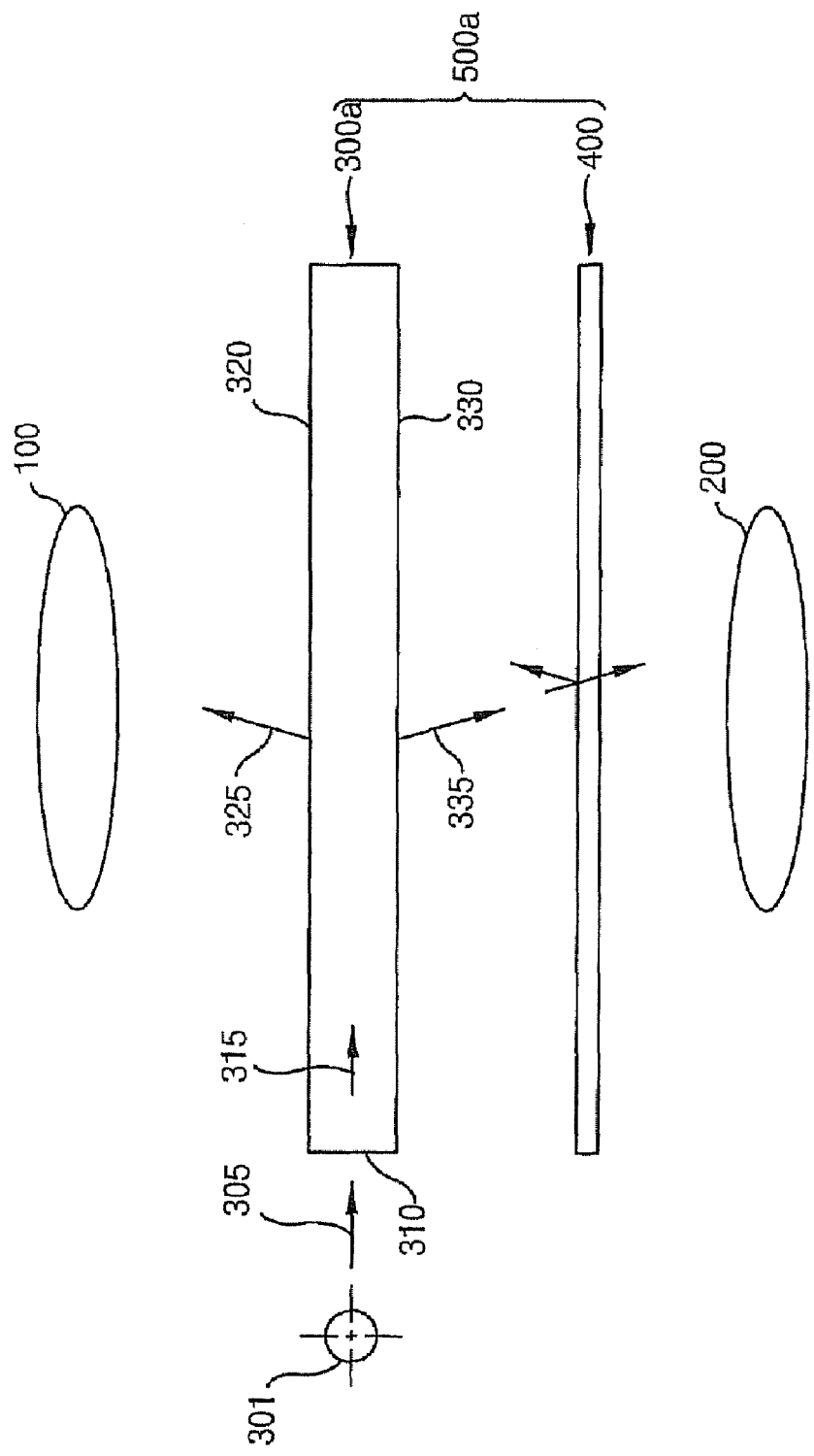
FIG. 1 is a schematic diagram showing a backlight assembly for emitting a light in two directions according to a first embodiment of the present invention.

FIG. 1 is a schematic diagram showing a backlight assembly for emitting a light in two directions according to a first embodiment of the present invention.

Referring to FIG. 1, a backlight assembly 500a includes a light guide plate 300a and a brightness control member 400. The light guide plate 300a has a rectangular parallelepiped shape and is disposed between a first display area 100 and a second display area 200. The light guide plate 300a includes four side surfaces including a light incident surface 310, a first light emitting surface 320 and a second light emitting surface 330.

Particularly, the first and second light emitting surfaces 320 and 330 are facing to each other and have a rectangular shape, respectively. The first light emitting surface 320 is connected to the second light emitting surface 320 by means of four side surfaces including the light incident surface 310, which are perpendicular to the first and second light emitting surfaces 320 and 330.

The light incident surface 310 of the light guide plate 300a receives a first light 305 from an external. The first light 305 is emitted from a point light source such as a light emitting diode or a linear light source such as a CCFL. The light source that emits the first light has been indicated by a reference numeral "301".

The first light 305 is changed into a second light 315 during passing through the light incident surface 310 having a medium different to an air between the light source 301 and the light incident surface 310. The second light 315 is reflected inside the light guide plate 300a according to the refraction's law and emitted from the light guide plate 300a to two directions. A light corresponding to a portion of the second light 315 is emitted from the first light surface 320 to the first display area 100. The light emitted from the first light surface 320 to the first display area 100 is defined as a third light 325.

A light corresponding to a remained portion of the second light 315 is emitted from the second light emitting surface 330 to the second display area 200. The light emitted from the second light emitting surface 330 and provided to the second display area 200 is defined as a fourth light 335.

Accordingly, it is possible to supply the first light 305 to the first and second display areas 100 and 200 using the light guide plate 300a.

However, it is difficult to control a first brightness at the first display area and a second brightness at the second display area using only the light guide plate 300a. In order to control the first and second brightness, the light guide plate 300a has to be re-designed and re-manufactured.

In the present invention, the brightness control member 400 controls the first and second brightness at the first and second display areas 100 and 200. The brightness control member 400 reflects a portion of the fourth light 335 to the first display area 100 and transmits a remained portion of the fourth light 335 to the second display area 200.

The brightness control member 400 has a sheet shape or a plate shape comprised of a PET (Polyethylene Terephthalate) resin. The brightness control member 400 may be fabricated to reflect the light of about 80% of the fourth light 335 and transmit the light of about 20% of the fourth light 335 or to reflect die light of about 20% of the fourth light 335 and transmit the light of about 80% of the fourth light 335. The brightness control member 400 may be fabricated using a material for partially reflecting and transmitting a light.

Figure 2:
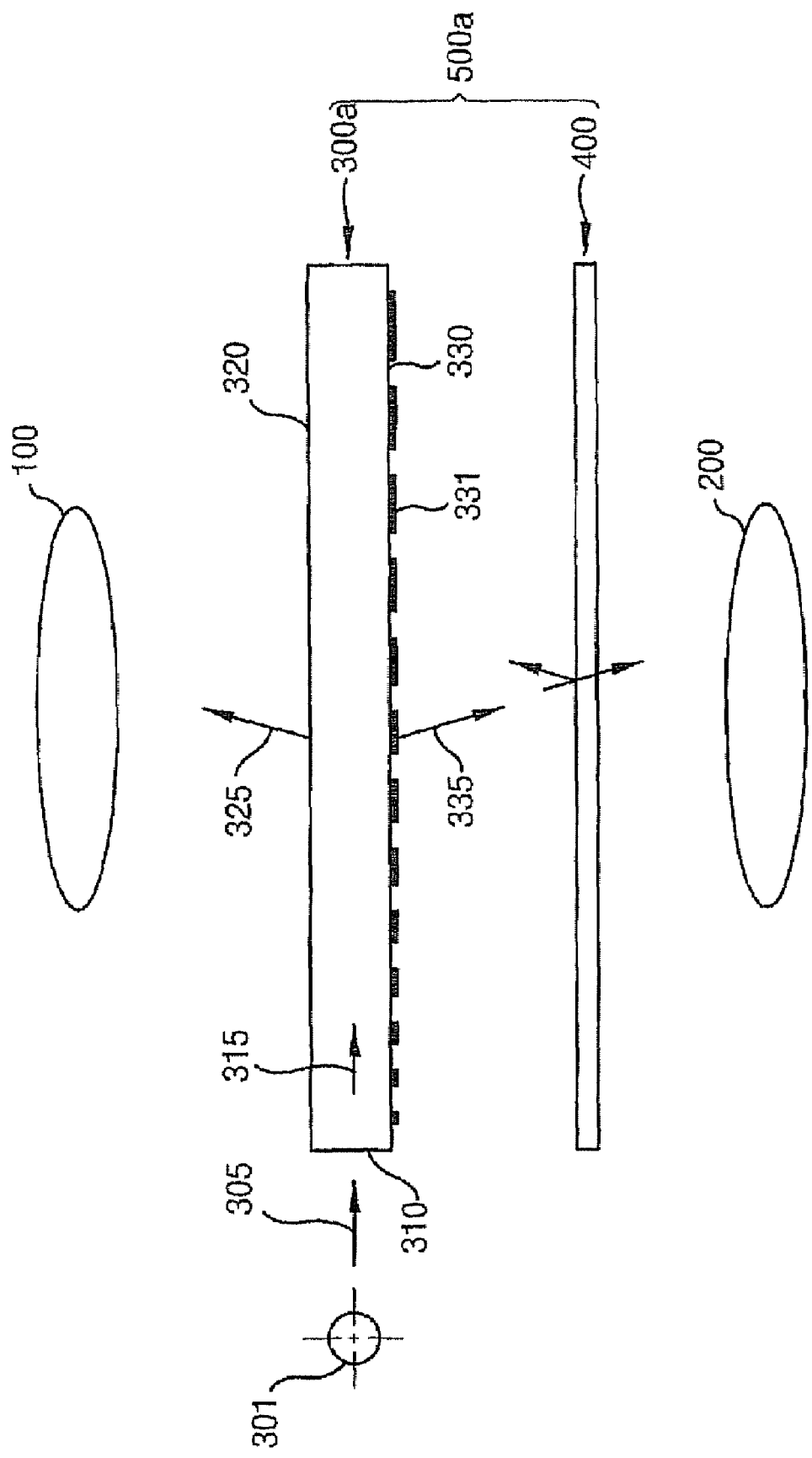
FIG. 2 is a schematic diagram showing a light reflecting pattern disposed on a light guide plate of the backlight assembly shown in FIG. 1.
Figure 3:
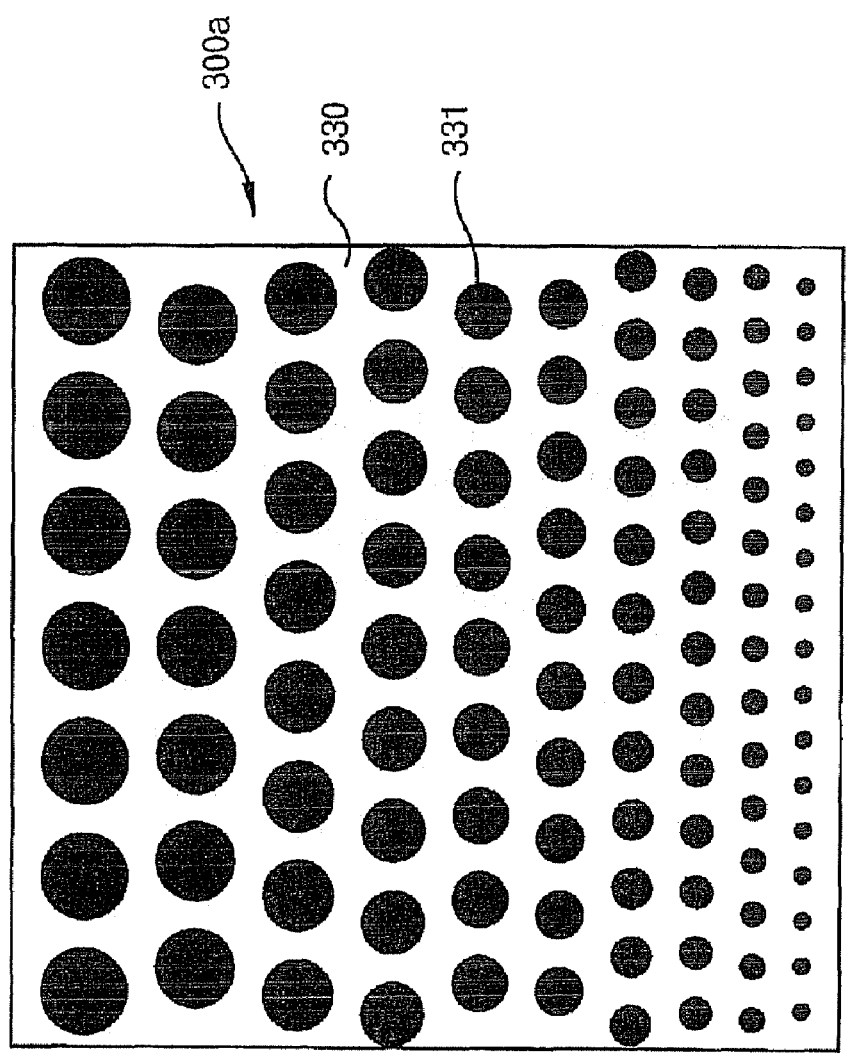
FIG. 3 is a schematic diagram showing a size and an arrangement of the light reflecting pattern shown in FIG. 2.

FIG. 2 is a schematic diagram showing a light reflecting pattern disposed on a light guide plate of the backlight assembly shown in FIG. 1 to make a new backlight assembly 500b, and FIG. 3 is a schematic diagram showing a size and an arrangement of the light reflecting pattern shown in FIG. 2.

Referring to FIGS. 2 and 3, the light guide plate 300a includes a plurality of light reflecting pads 331 disposed on the second light emitting surface 330 facing the brightness control member 400. The light reflecting pads 331 reflect a portion of the second light 315, which is in contact with the second light emitting surface 330, to the first light emitting surface 320.

The light reflecting pads 331 are disposed on the second light emitting surface 330 in a matrix configuration. The light reflecting pads 331 are formed on the second light emitting surface 330 using a silk screen method. Plane Sizes of the light reflecting pads 331 become larger according as the light reflecting pads 331 are spaced more apart from the light incident surface 310. Changing the plane sizes of the light reflecting pads 331 is for uniformly maintaining a reflecting amount of the fourth light 335 by the light reflecting pads 331 disposed over the second light emitting surface 330.

As shown in FIG. 2, the first light emitting surface 320 is parallel to the second light emitting surface 330.

Figure 4:
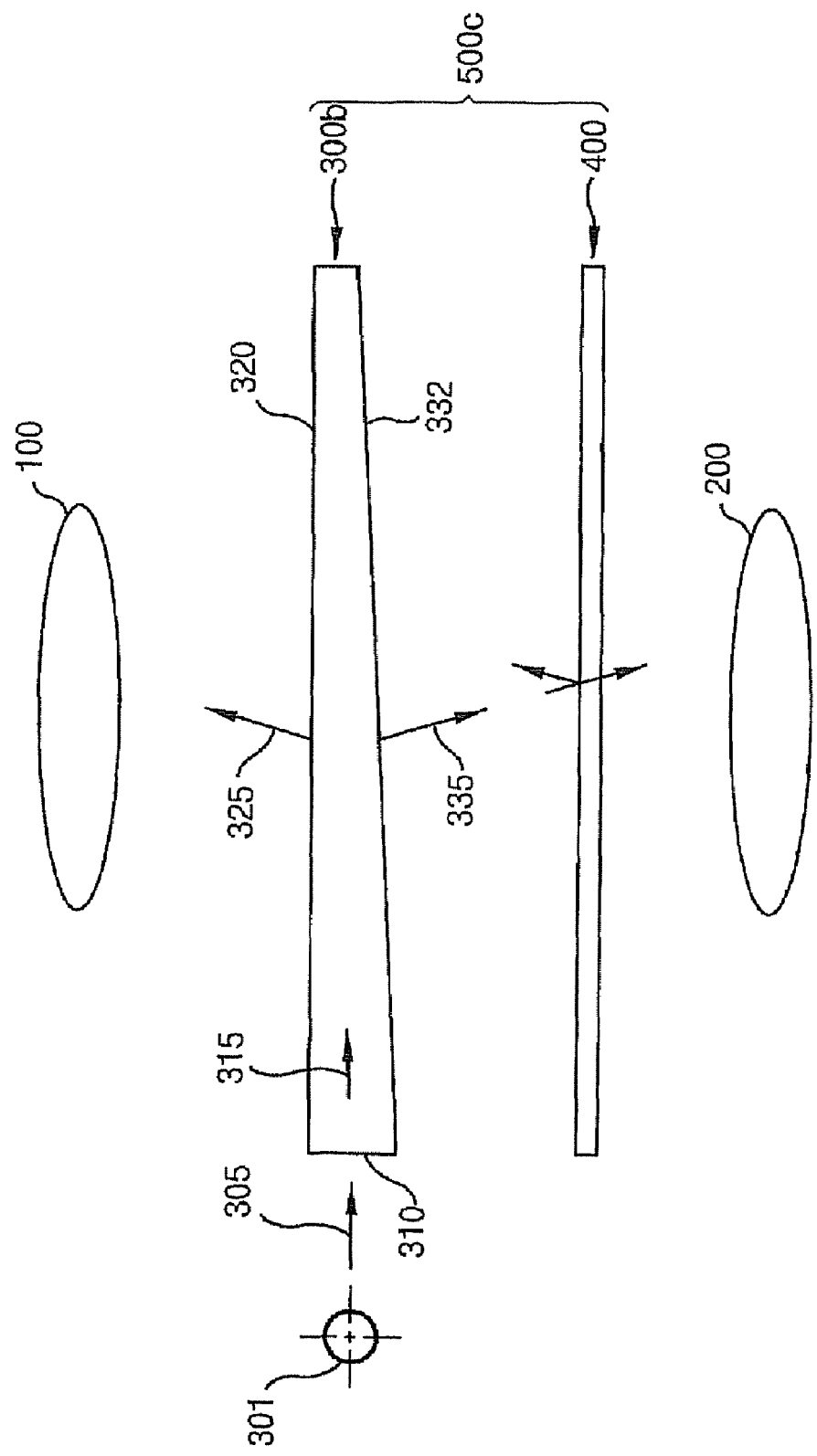
FIG. 4 is a schematic diagram showing a backlight assembly for emitting a light in two directions according to a second embodiment of the present invention.
Figure 5:
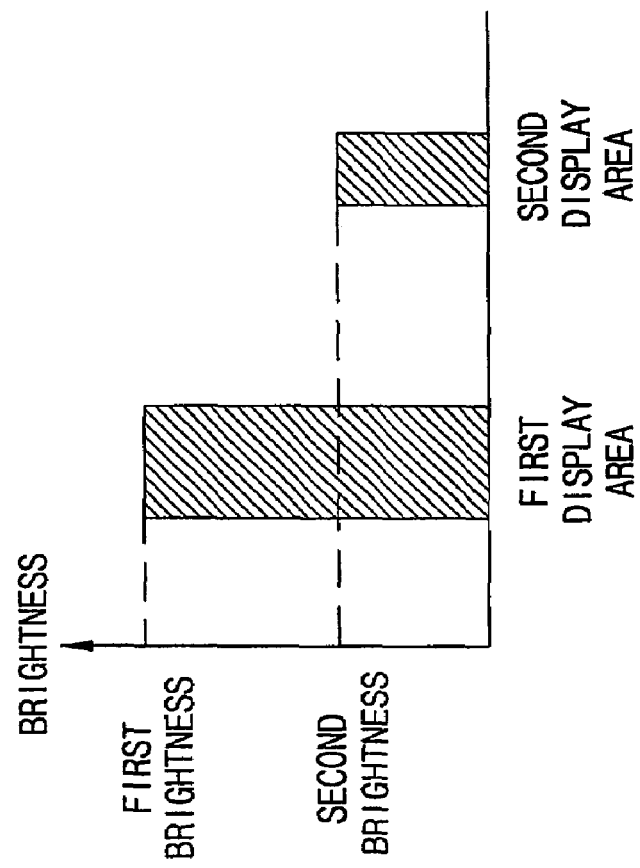
FIG. 5 is a graph showing brightness at a first display area and a second display area of the backlight assembly according to the present invention.
Figure 6:
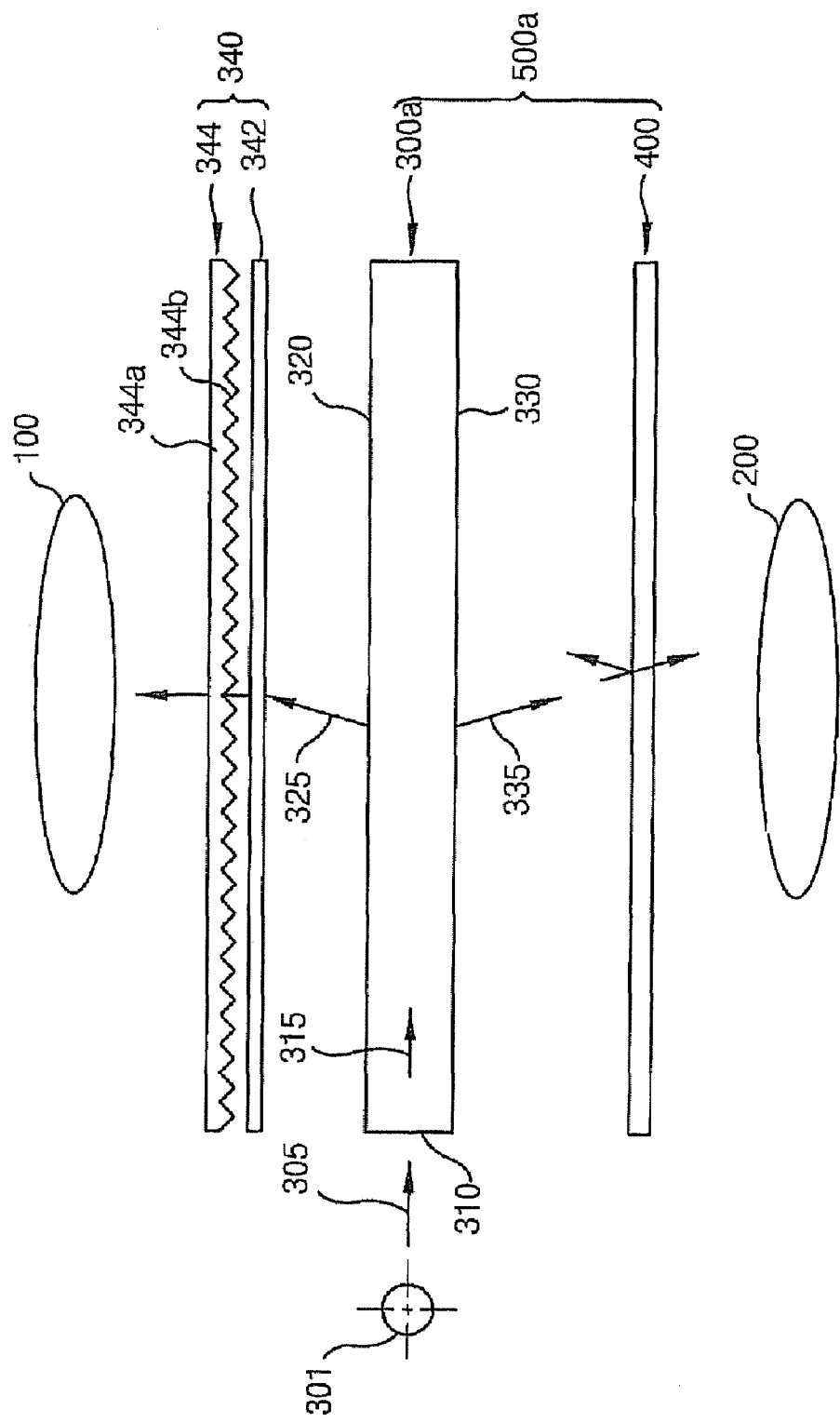
FIG. 6 is a schematic diagram showing a backlight assembly for emitting a light in two directions according to a third embodiment of the present invention.

FIG. 4 is a schematic diagram showing a backlight assembly 500c for emitting a light in two directions according to a second embodiment of the present invention. FIG. 5 is a graph showing brightness at a first display area and a second display area of the backlight assembly according to the present invention. FIG. 6 is a schematic diagram showing a backlight assembly 500a for emitting a light in two directions according to a third embodiment of the present invention.

Referring to FIG. 4, the first light emitting surface 320 of the light guide plate 300b is not parallel to the second light emitting surface 330. Particularly, a thickness between the first and second light emitting surfaces 320 and 322 is thickest at the light incident surface 310 and gradually becomes thinner according as the first and second light emitting surfaces 320 and 322 become more distant from the light incident surface 310.

Referring to FIG. 5, the first brightness at the first display area 100 is higher than the second brightness at the second display area 200. In order to obtain the result that the first brightness is higher than the second brightness, the brightness control member 400 has to be controlled to have a light reflectance higher than a light transmittance with respect to the fourth light 335. Similarly, in order to obtain a result that the second brightness at the second display area 200 is higher than the first brightness at the first display area 100, the brightness control member 400 has to be controlled to have a light transmittance higher than a light reflectance with respect to the fourth light 335.

As shown in FIG. 6, in order to enhance optical properties of the light guide plate 300a of the backlight assembly 500a, an optical sheet 340 may be disposed on the first light emitting surface 320 of the light guide plate 300a.

The optical sheet 340 includes a diffusion sheet 342 and a prism sheet 344. The diffusion sheet 342 diffuses the third light 325 and the portion of the fourth light 355 reflected from the brightness control member 400 to provide a light having a uniform brightness to the first display area 100.

The prism sheet 344 disposed on the diffusion sheet 342 controls a direction of the light emitted through the diffusion sheet 342 to provide the light having an improved visual angle. Particularly, the prism sheet 344 includes a body portion 344a having a plate shape and a brightness enhancing portion 344b for enhancing the brightness, which is disposed on a surface facing to the first light emitting surface 320. The brightness enhancing portion 344b is successively disposed on the body portion 344a and protruded from the body portion 344a to have a triangle shape in section.

Figure 7:
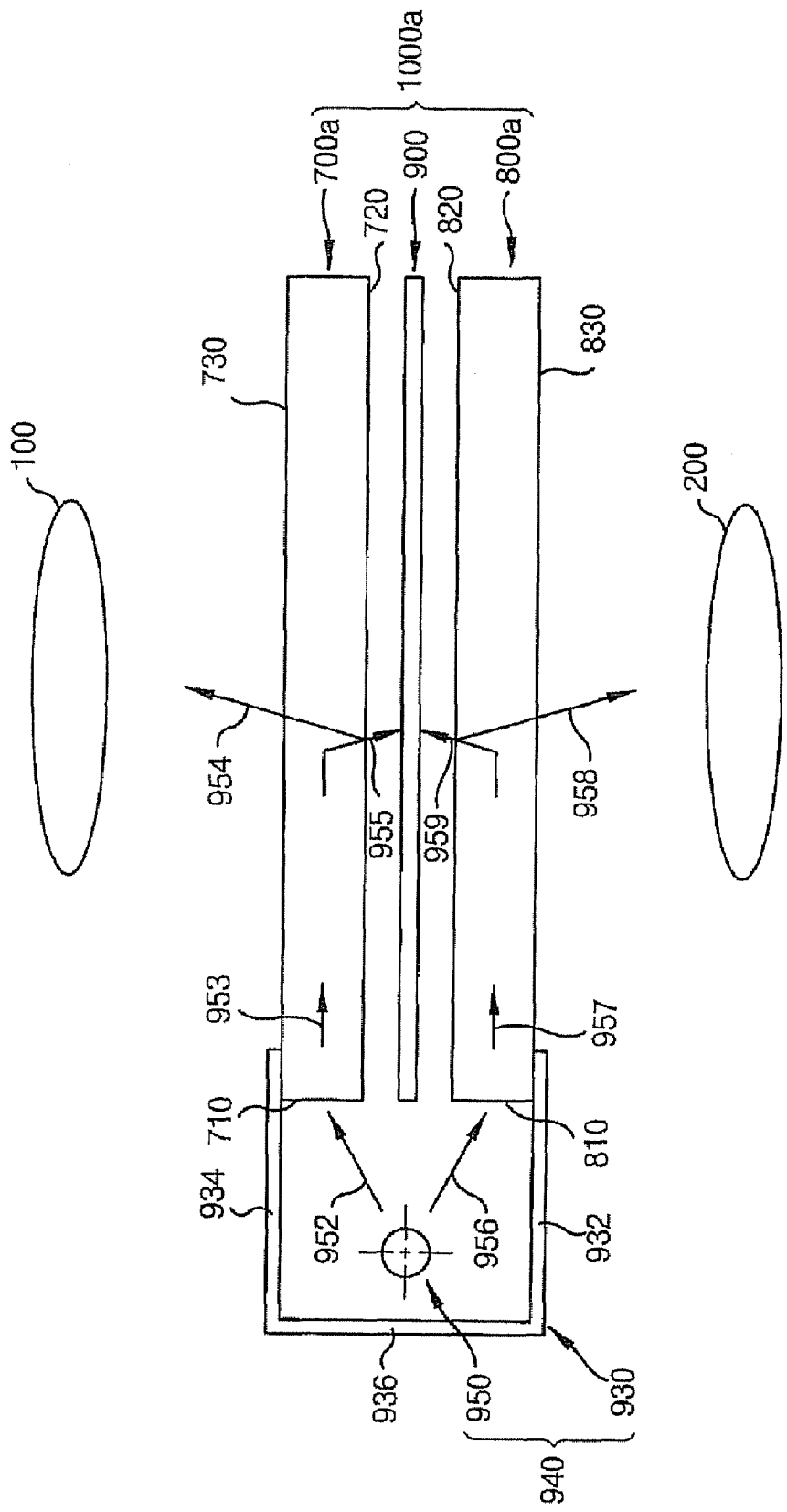
FIG. 7 is a schematic diagram showing a backlight assembly for emitting a light in two directions according to a fourth embodiment of the present invention.

FIG. 7 is a schematic diagram showing a backlight assembly for emitting a light in two directions according to a fourth embodiment of the present invention.

Referring to FIG. 7, a backlight assembly 1000a includes a first light guide plate 700a, a second light guide plate 800a, a lamp assembly 940 and a brightness control member 900.

The lamp assembly 940 includes a lamp 950 and a lamp reflector 930. The lamp 950 may include an LED as a point light source or a CCFL as a linear light source. A light incident to the first light guide plate 700 from the light source is defined as a first light 952 and a light incident to the second light guide plate 800 from the light source is defined as a fifth light 956.

The lamp reflector 930 reflects the light emitted from the lamp 950 in a radial shape to provide the light to the directions to which the first and fifth lights 952 and 956 are provided. The lamp reflector 930 includes first and second side surfaces 932 and 934 and a connecting side surface 936 that connects the first side surface 932 to the second side surface 934. The first and second side surfaces 932 and 934 and the connecting side surface 936 have a reflectance higher than that of outer surfaces thereof. The first and second light guide plates 700a and 800a are disposed between the first and second side surfaces 932 and 934.

The first light guide plate 700a has a rectangular parallelepiped shape and is disposed between a first display area 100 and a second display area 200. The first light guide plate 700a includes four side surfaces including a first light incident surface 710, a first surface 720 and a second surface 730.

The first and second surfaces 720 and 730 have the rectangular parallelepiped shape, respectively. The first and second surfaces 720 and 730 are connected to each other by means of the four side surfaces.

The first light incident surface 710 of the first light guide plate 700a receives the first light 952 from the lamp 950. The first light 952 is changed into a second light 953 during passing through the first light incident surface 710. The first surface 720 reflects a portion of the second light 953 satisfied with a reflection condition according to the refraction's law to the first display area 100. A remained portion of the second light 953 not satisfied with the reflection condition of the refraction's law is leaked to the second display area 200.

Hereinafter, the portion of the second light 953 reflected to the first display area 100 is defined as a third light 954 and the remained portion of the second light 953 transmitted to the second display area 200 is defined as a fourth light 955.

The second light guide plate 800a has a rectangular parallelepiped shape. The second light guide plate 800a is disposed between a first display area 100 and a second display area 200 and adjacent to the first surface 720 of the light guide plate 700a. Also, the first and second light guide plates 700a and 800a are parallel to each other. The second light guide plate 800a includes four side surfaces including a second light incident surface 810, a third surface 820 and a fourth surface 830. The four side surfaces connect the third side surface 820 to the fourth surfaces 820 and 830 of the second light guide plate 800a. The fourth surface 830 has a shape same to that of the third surface 820.

The second light incident surface 810 of the light guide plate 800 receives the fifth light 956 from the lamp 950. The fifth light 956 is changed into a sixth light 957 during passing through the second light incident surface 810. The third surface 820 reflects a portion of the sixth light 957 satisfied with the reflection condition of the refraction's law to the second display area 200. A remained portion of the sixth light 957 not satisfied with the reflection condition of the refraction's law is leaked to the second display area 200.

Hereinafter, the portion of the sixth light 957 reflected to the second display area 200 is defined as a seventh light 958 and the remained portion of the sixth light 957 transmitted to the first display area 100 is defined as a eighth light 959.

The brightness control member 900, that is a reflecting plate 900 is disposed between the first and second light guide plates 700a and 800a. The reflecting plate 900 has a sheet shape or a plate shape comprised of a PET resin. The reflecting plate 900 reflects the fourth light 955 leaked from the first surface 720 of the first light guide plate 700a to the first display area 100 and reflects the eighth light 959 leaked from the third surface 820 of the light guide plate 800a to the second display area 200.

Hereinafter, operations of the backlight assembly 1000a will be described with reference to FIG. 7.

The first and fifth lights 952 and 956 emitted from the lamp 950 of the lamp assembly 940 are input to the first and second light incident surfaces 710 and 810 of the first and second light guide plate 700a and 800a, respectively. The first light 952 is changed into the second light 953.

The portion of the second light 953, which is satisfied with the reflection condition of the refraction's law, is reflected by the first surface 720 and provided to the first display area 100 through the second surface 730 as the third light 954. The remained portion of the second light 953, which is satisfied with the transmittal condition of the refraction's law, is supplied to the second display area 100 through the first surface 720 as the fourth light 955.

The fifth light 956 emitted from the lamp F950 of the lamp assembly 940 is changed into the sixth light 957. The portion of the sixth light 957, which is satisfied with the reflection condition of the refraction's law, is reflected by the third surface 820 and provided to the second display area 200 through the fourth surface 830 as the seventh light 958. The remained portion of the sixth light 957, which is not satisfied with the reflection condition of the refraction's law, is supplied to the first display area 100 through the third surface 820 as the eighth light 959.

The third and seventh lights 954 and 958 are provided to the first and second display areas 100 and 200 through the first and second light guide plates 700a and 800a. The fourth and eighth lights 954 and 959 are leaked into the first and second light guide plates 700a and 800a.

The fourth and eighth lights 955 and 959 are reflected form the reflecting plate 900 to provide the fourth and eighth lights 955 and 959 to the first and second display areas 100 and 200, respectively.

In the backlight assembly 1000a, the first surface 720 of the first light guide plate 700a is parallel to the second surface 730 thereof and the third surface 820 of the second light guide plate 800a is parallel to the fourth surface 830. Also, the first light guide plate 700a has a size same to that of the second light guide plate 800a.

Figure 8:
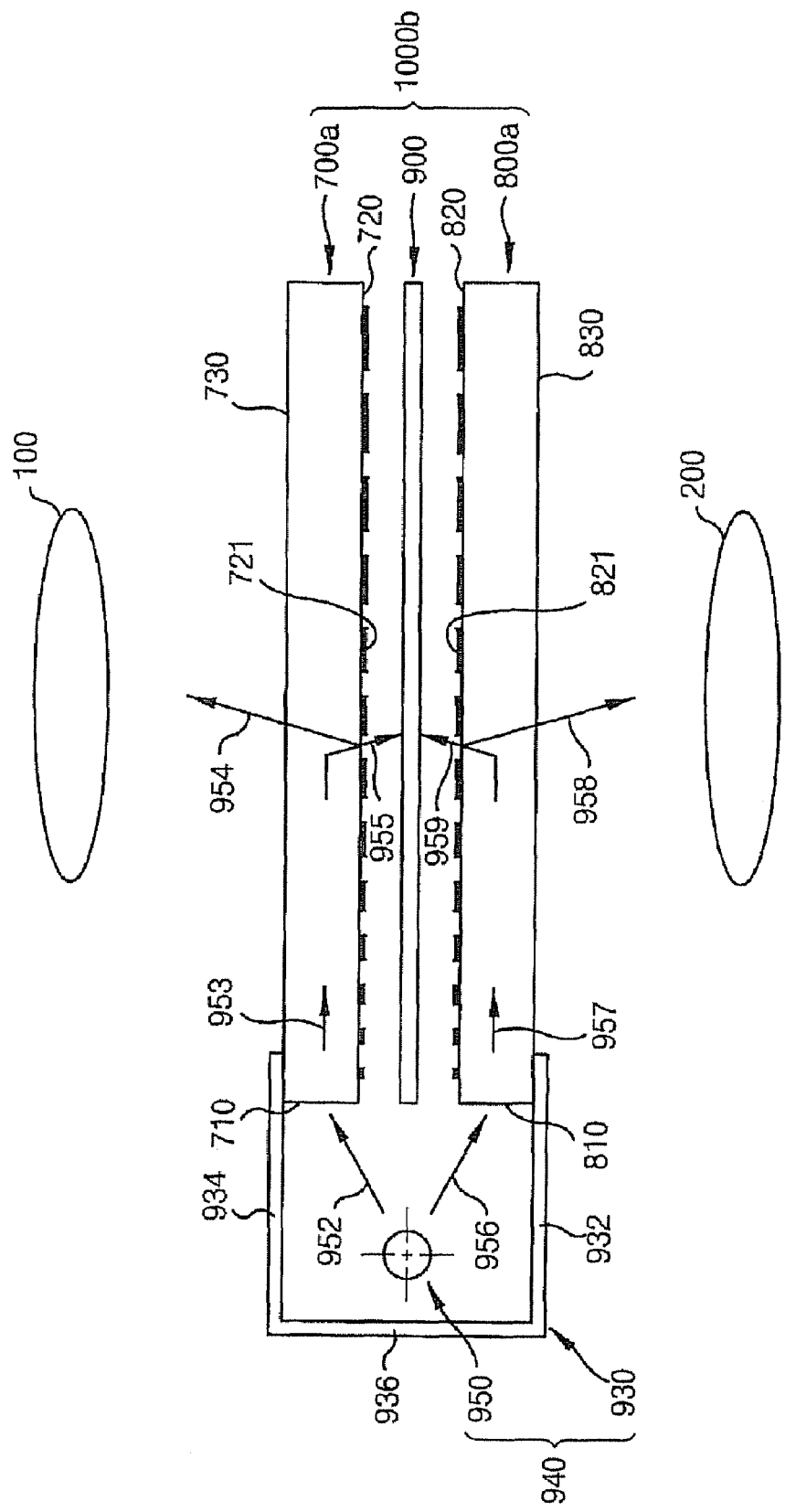
FIG. 8 is a schematic diagram showing a light reflecting pattern disposed on a light guide plate shown in FIG. 7.
Figure 9:
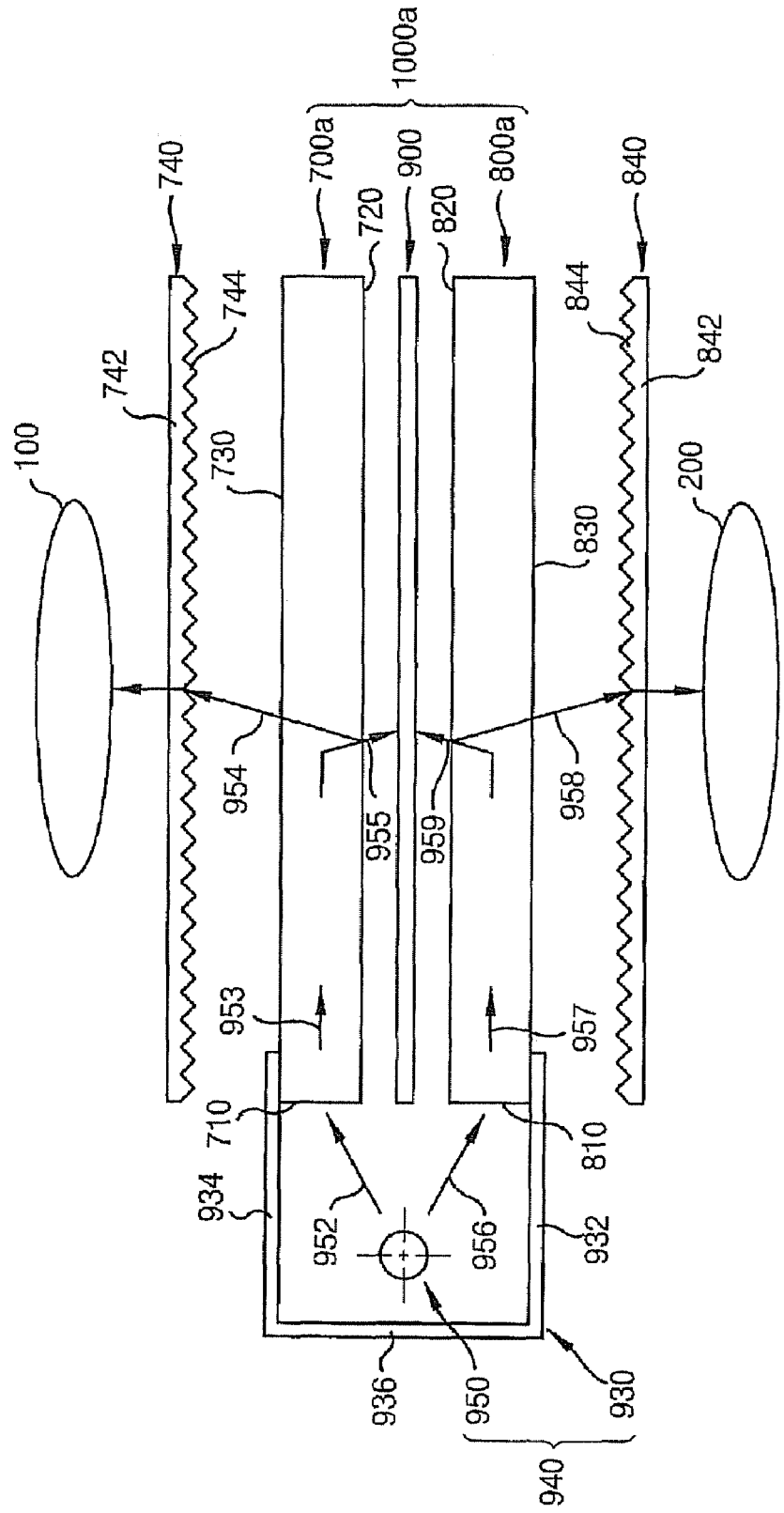
FIG. 9 is a schematic diagram showing optical sheets disposed on the backlight assembly shown in FIG. 8.

FIG. 8 is a schematic diagram showing a light reflecting pattern disposed on a light guide plate shown in FIG. 7. FIG. 9 is a schematic diagram showing optical sheets disposed on the backlight assembly shown in FIG. 8.

As shown in FIG. 8, in a backlight assembly 1000b the first light guide plate 700a includes a plurality of first light reflecting pads 721 disposed on the first surface 720 thereof and the second light guide plate 800a includes a plurality of second light reflecting pads 821 disposed on the third surface 820 thereof. The first and second light reflecting pads 721 and 821 are disposed in the matrix configuration.

Sizes of the first and second light reflecting pads 721 and 821 become larger according as the first and second light reflecting pads 721 and 821 are spaced more apart from the first and second light incident surface 710 and 810, respectively.

The backlight assembly 1000a shown in FIG. 7 may further include a first optical sheet 740 and a second optical sheet 840 as shown in FIG. 9.

Referring to FIG. 9, the first optical sheet 740 is disposed between the first display area 100 and the first light guide plate 700a and faces the second surface 730 of the first light guide plate 700a.

The first optical sheet 740 includes a body portion 742 having a plate shape and a brightness enhancing portion 744 for enhancing the brightness, which is disposed on a surface facing to the first surface 720. The brightness enhancing portion 744 is successively disposed on the body portion 742 and protruded from the body portion 742 have a triangle shape in section.

The second optical sheet 840 is disposed between the second display area 200 and the second light guide plate 800 and faces the fourth surface 830 of the second light guide plate 800a.

The second optical sheet 840 includes a body portion 842 having a plate shape and a brightness enhancing portion 844 for enhancing the brightness, which is disposed on a surface facing to the fourth surface 830. The brightness enhancing portion 844 is successively disposed on the body portion 842 and protruded from the body portion 842 to have a triangle shape in section.

The first optical sheet 740 enhances optical properties such as a visual angle and a brightness distribution, etc., of the third light 954 and the portion of the eighth light 959. The second optical sheet 840 enhances optical properties such as the visual angle and the brightness distribution, etc., of the seventh light 958 and the portion of the fourth light 955.

Figure 10:
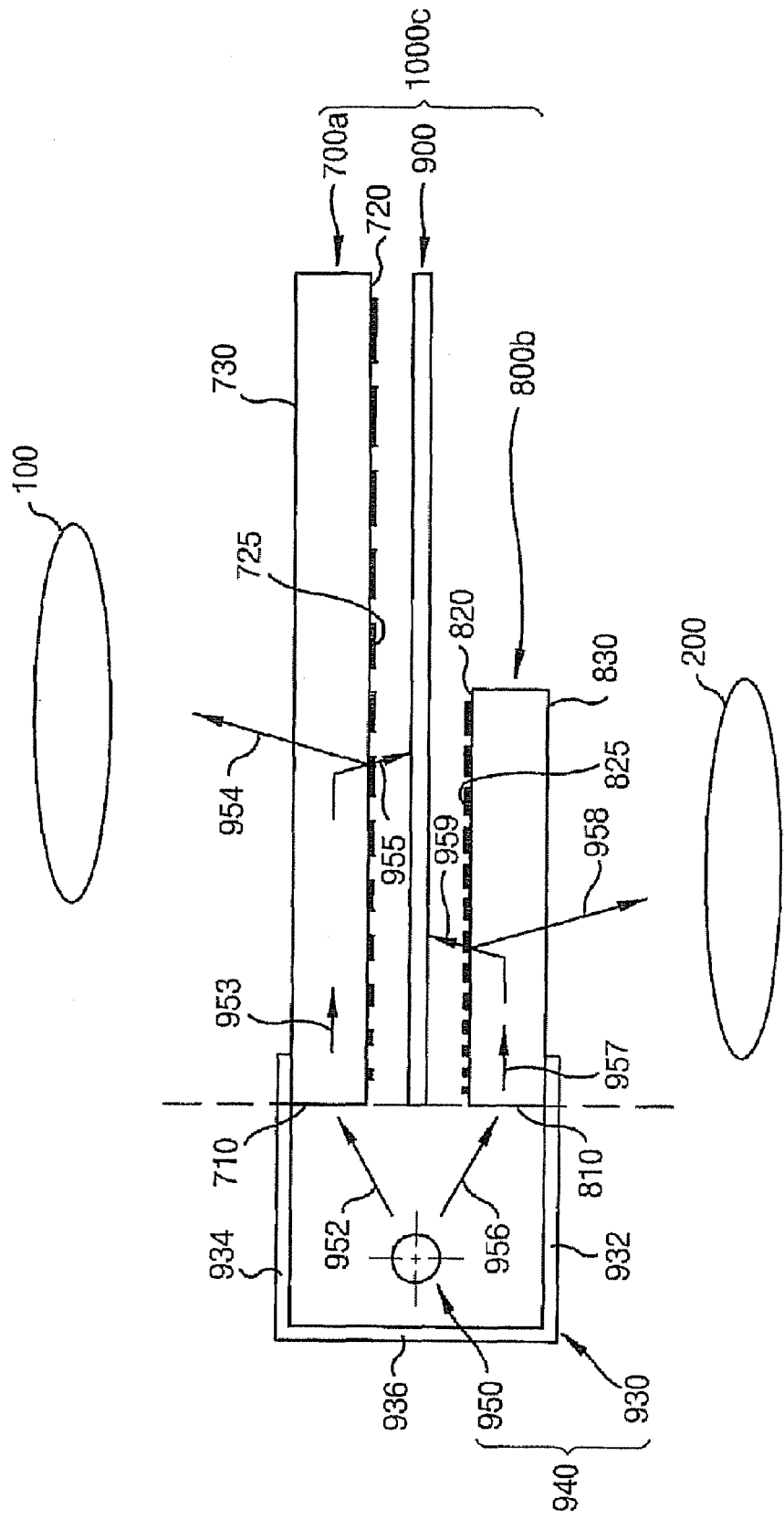
FIG. 10 is a schematic diagram showing a backlight assembly for emitting a light in two directions according to a fifth embodiment of the present invention.
Figure 11:
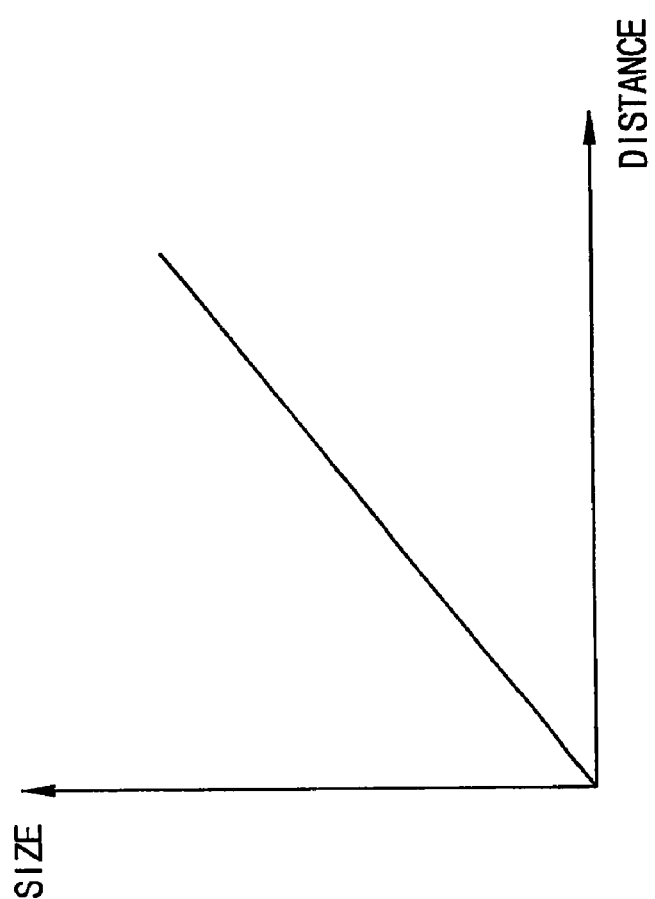
FIG. 11 is a graph showing a size of the light reflecting pattern shown in FIG. 10.
Figure 12:
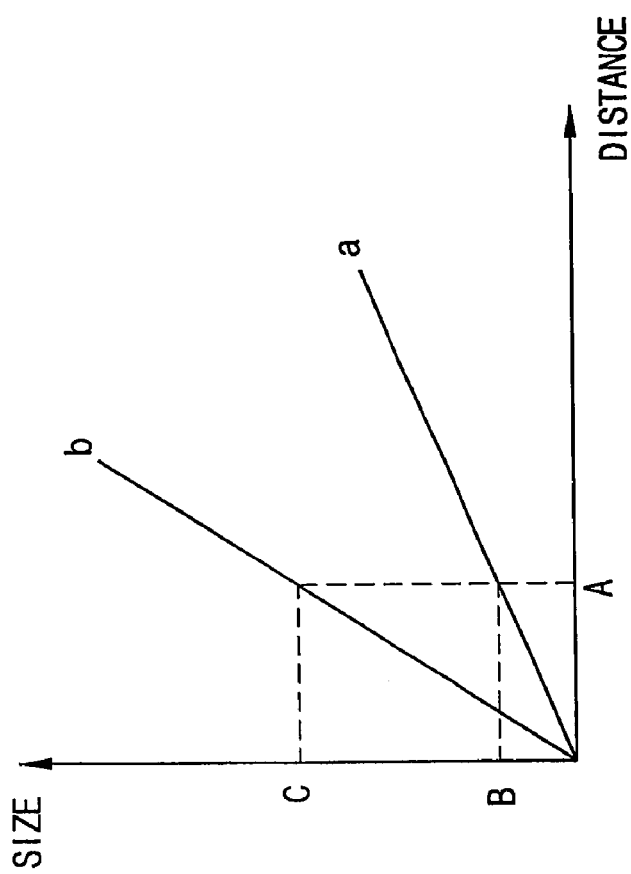
FIG. 12 is a graph showing differences of the size between a first light reflecting pad and a second light reflecting pad shown in FIG. 10.

FIG. 10 is a schematic diagram showing a backlight assembly 1000c for emitting a light in two directions according to a fifth embodiment of the present invention. FIG. 11 is a graph showing a size of the light reflecting pattern shown in FIG. 10. FIG. 12 is a graph showing differences of the size between a first light reflecting pad and a second light reflecting pad shown in FIG. 10.

Referring to FIG. 10, the first and second light guide plates 700a and 800b may be formed to have sizes different to each other. In FIG. 10, the first light guide plate 700a has a size greater than that of the second light guide plate 800b.

The first light guide plate 700a includes a first light reflecting pad 725 disposed on the first surface 720 thereof and the second light guide plate 800b includes a second light reflecting pad 825 disposed on the third surface 820 thereof. Where the size of the first light guide plate 700a is greater than that of the second light guide plate 800b, the first light reflecting pad 725 disposed on the first surface 720 has a pattern different to that of the second light reflecting pad 825 disposed on the third surface 820.

As shown in FIG. 11, sizes of the first and second light reflecting pads 725 and 825 become larger according as the first and second light reflecting pads 725 and 825 are spaced more apart from the first and second light incident surface 710 and 810, respectively. The size of the first light reflecting pad 725 is not same to that of the second light reflecting pad 825.

Referring to FIG. 12, a rate of change of the size of the second light reflecting pad 825 based on a distance between the second light incident surface 810 and the second light reflecting pad 825 is greater than that of the first light reflecting pad 725 based on a distance between the first light incident surface 710 and the first light reflecting pad 725. In FIG. 12, a graph indicated by a reference "a" shows the rate of change of the size of the first light reflecting pad 725 and a graph indicated by a reference "b" shows the rate of change of the size of the second light reflecting pad 825.

When the sizes of the first and second light reflecting pads 725 and 825 are measured at a position spaced apart from the first and second light incident surface 710 and 810 by a reference "A", the first light reflecting pad 725 has a size "B" and the second light reflecting pad 825 has a size "C" greater than the size "B".

Figure 13:
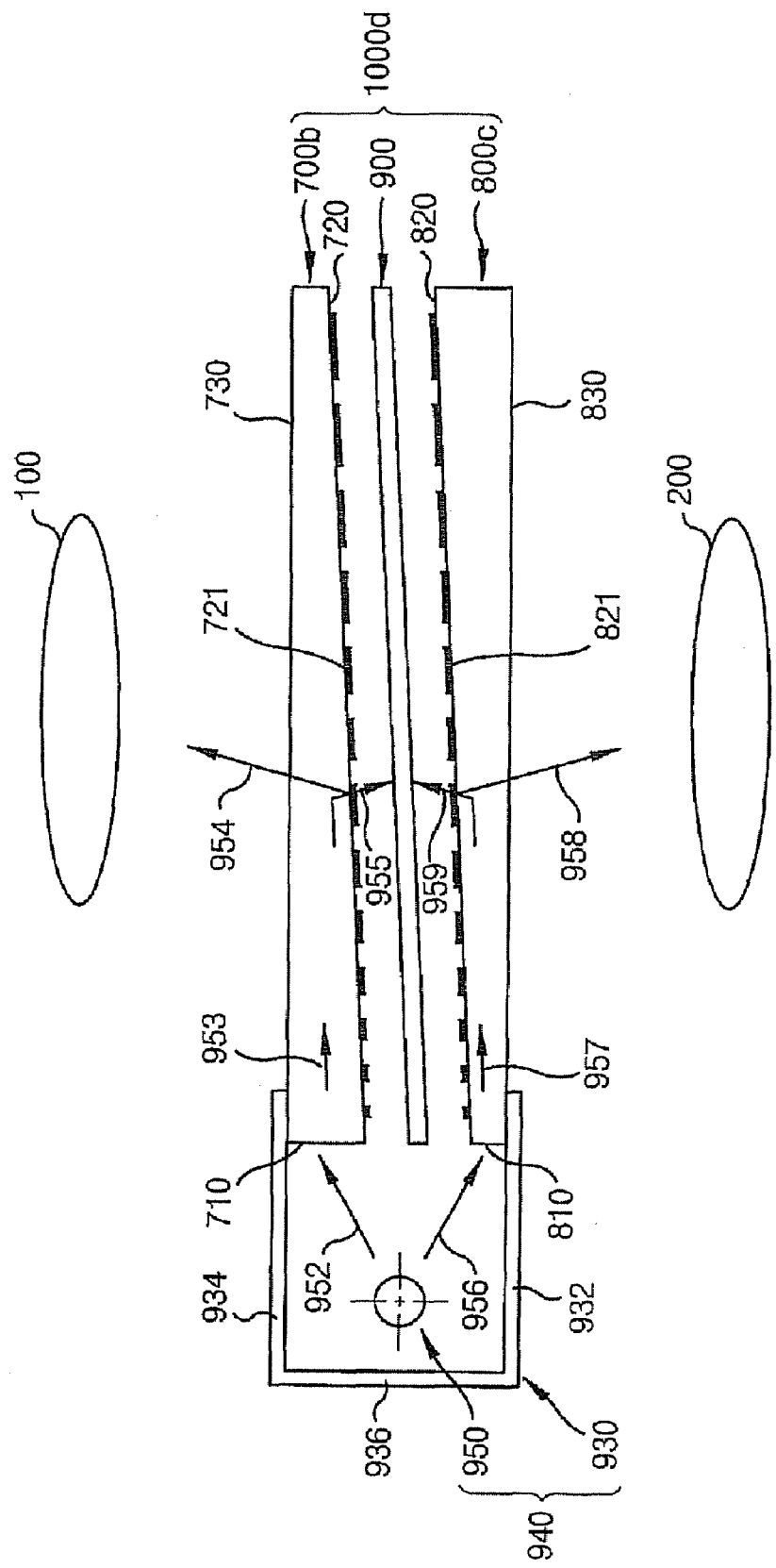
FIG. 13 is a schematic diagram showing a backlight assembly for emitting a light in two directions according to a sixth embodiment of the present invention.

FIG. 13 is a schematic diagram showing a backlight assembly 1000d for emitting a light in two directions according to a sixth embodiment of the present invention.

Figure 14:
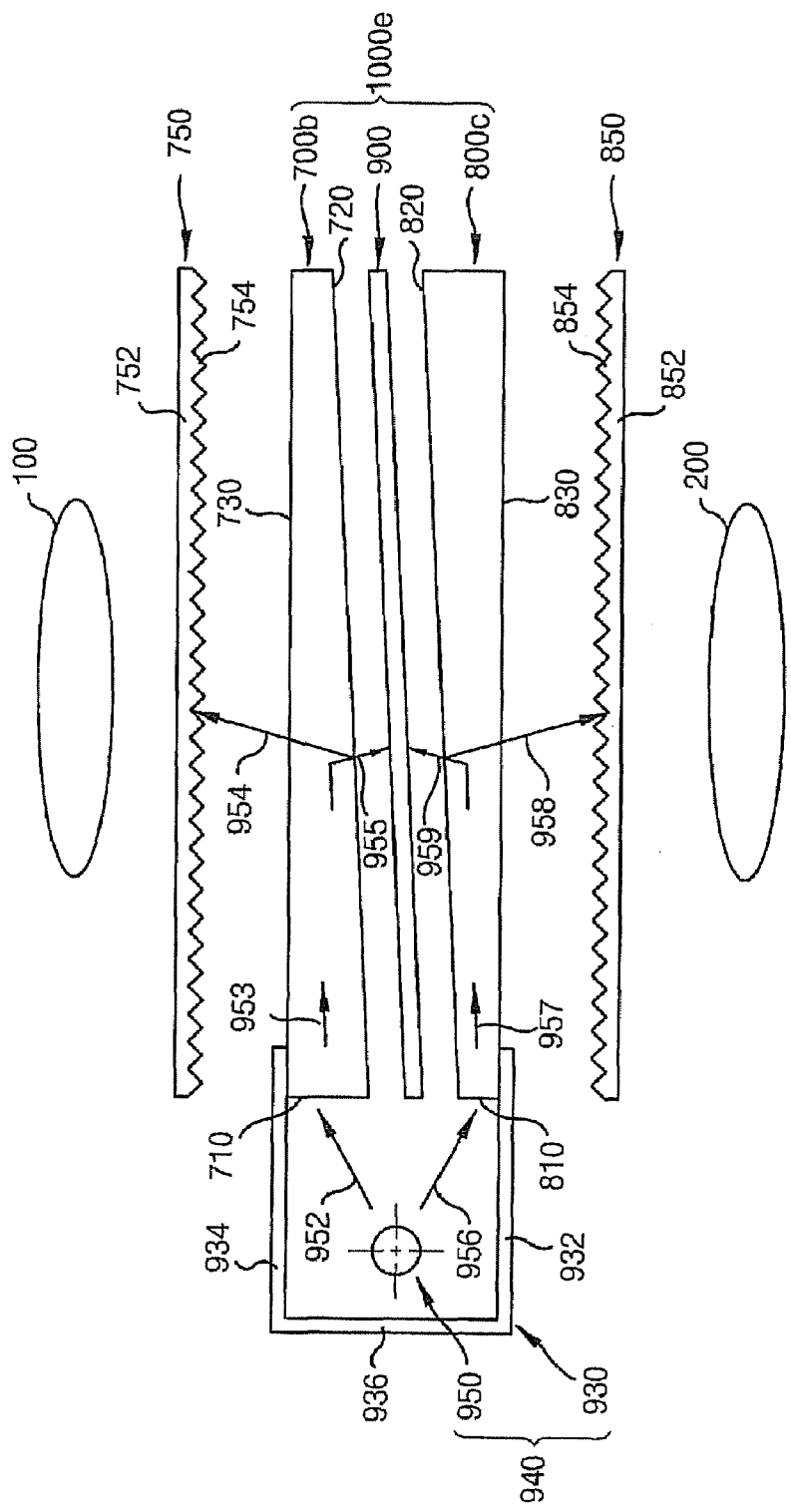
FIG. 14 is a schematic diagram showing optical sheets disposed on the backlight assembly shown in FIG. 13.

FIG. 14 is a schematic diagram showing optical sheets disposed on a backlight assembly 1000e, similar to the backlight assembly shown in FIG. 13, only omitting the reflecting pads 721 and 821 to be discussed below.

Referring to FIG. 13, the first and second light guide plates 700 and 800 of the backlight assembly 1000 may have a wedge shape. A thickness between the first and second surfaces 720 and 730 of the first light guide plate 700b is thickest at the first light incident surface 710 and gradually becomes thinner according as the first and second surfaces 720 and 730 become more distant from the first light incident surface 710. That is, the first surface 720 is inclined toward the second surface 730. A thickness between the third and fourth surfaces 820 and 830 of the second light guide plate 800c gradually becomes thinner according as the first and second surfaces 820 and 830 become more close to the second light incident surface 810. That is, the third surface 820 is inclined toward the fourth surface 830 and is parallel to the first surface 720. Also, the first surface 720 of the first light guide plate 700 is parallel to the fourth surface 830 of the second light guide plate 800c.

The first light guide plate 700b includes a first light reflecting pad 721 disposed on the first surface 720 thereof and the second light guide plate 800c includes a second light reflecting pad 821 disposed on the third surface 820 thereof. Sizes of the first and second light reflecting pads 721 and 821 become larger according as the first and second light reflecting pads 721 and 821 are spaced more apart from the first and second light incident surface 710 and 810, respectively.

The backlight assembly 1000d shown in FIG. 13 may further include a first optical sheet 740 and a second optical sheet 840 as shown in FIG. 14.

Referring to FIG. 14, the first optical sheet 740 is disposed between the first display area 100 and the first light guide plate 700b and faces the second surface 730 of the first light guide plate 700b.

The first optical sheet 750 includes a body portion 752 having a plate shape and a brightness enhancing portion 754 for enhancing the brightness, which is disposed on a surface facing to the first surface 720. The brightness enhancing portion 754 is successively disposed on the body portion 752 and protruded from the body portion 752 to have a triangle shape in section.

The second optical sheet 840 is disposed between the second display area 200 and the second light guide plate 800c and faces the fourth surface 830 of the second light guide plate 800c.

The second optical sheet 850 includes a body portion 852 having a plate shape and a brightness enhancing portion 854 for enhancing the brightness, which is disposed on a surface facing to the fourth surface 830. The brightness enhancing portion 854 is successively disposed on the body portion 852 and protruded from the body portion 852 to have a triangle shape in section.

The first optical sheet 740 enhances optical properties such as a visual angle and a brightness distribution, etc., of the third light 954 and the portion of the eighth light 959. The second optical sheet 840 enhances optical properties such as the visual angle and the brightness distribution, etc., of the seventh light 958 and the portion of the fourth light 955.

Figure 15:
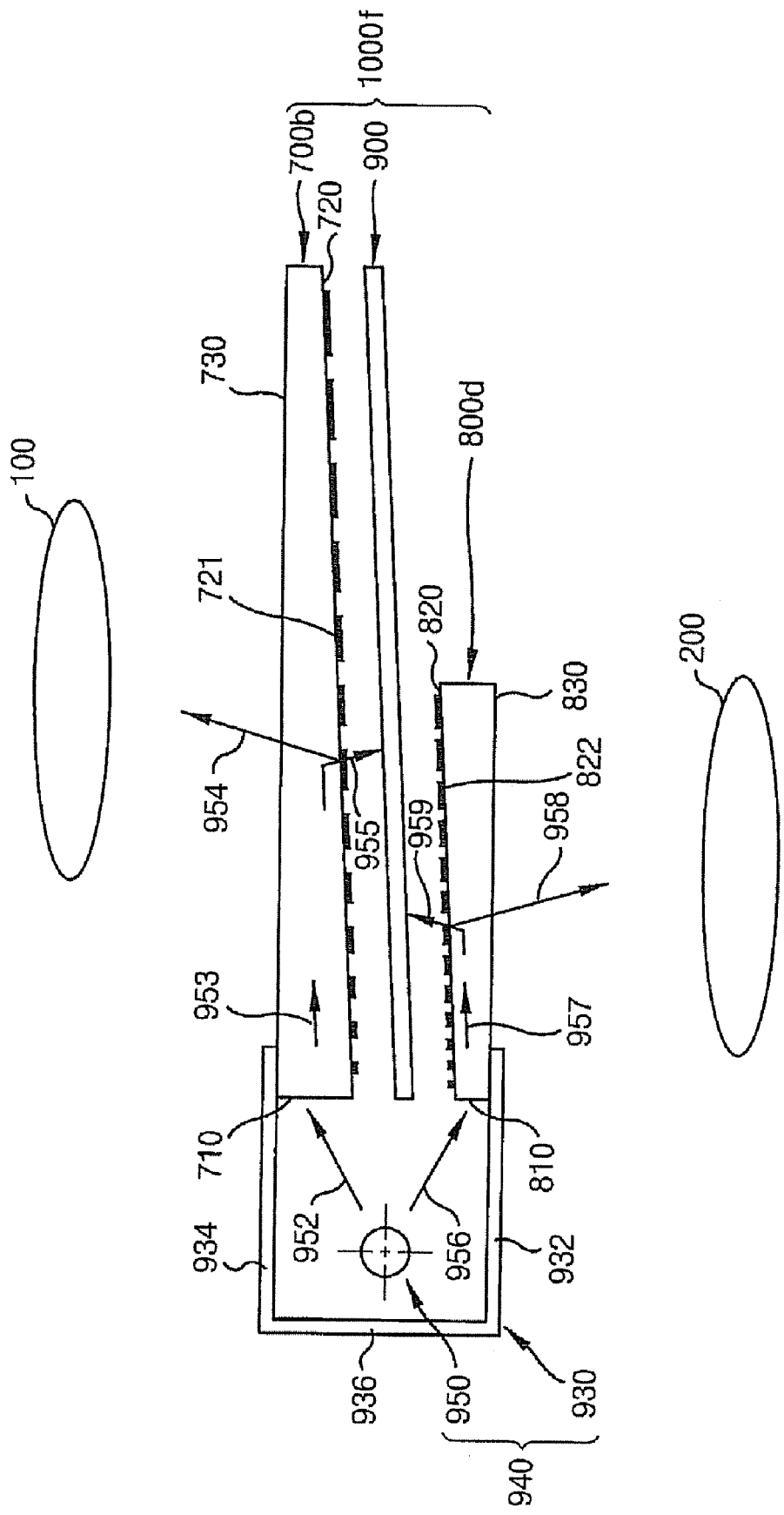
FIG. 15 is a schematic diagram showing a backlight assembly for emitting a light in two directions according to a seventh embodiment of the present invention.
Figure 16:
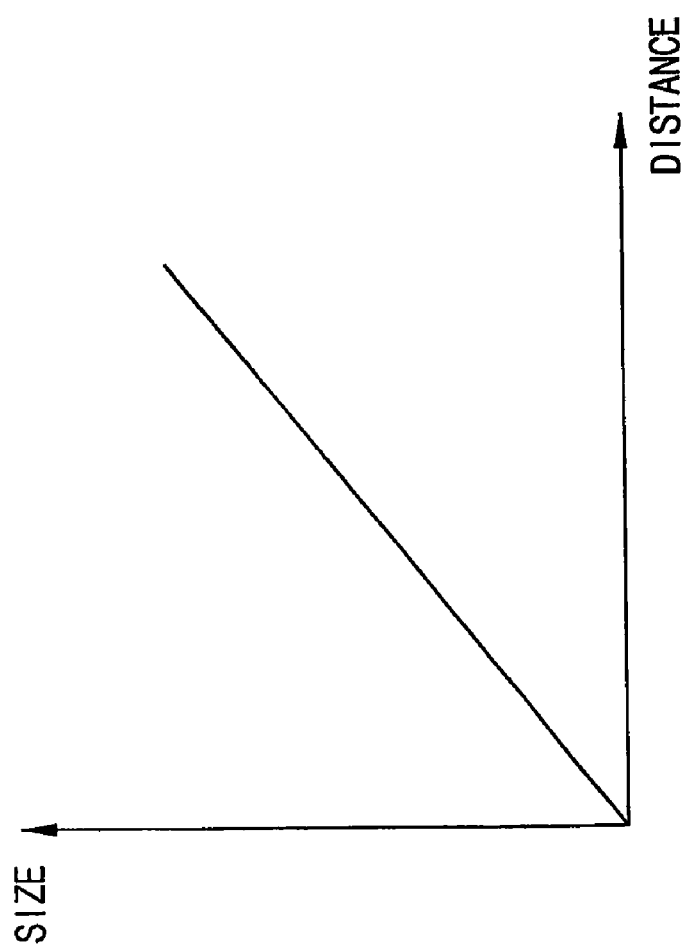
FIG. 16 is a graph showing a size of the light reflecting pattern shown in FIG. 15.
Figure 17:
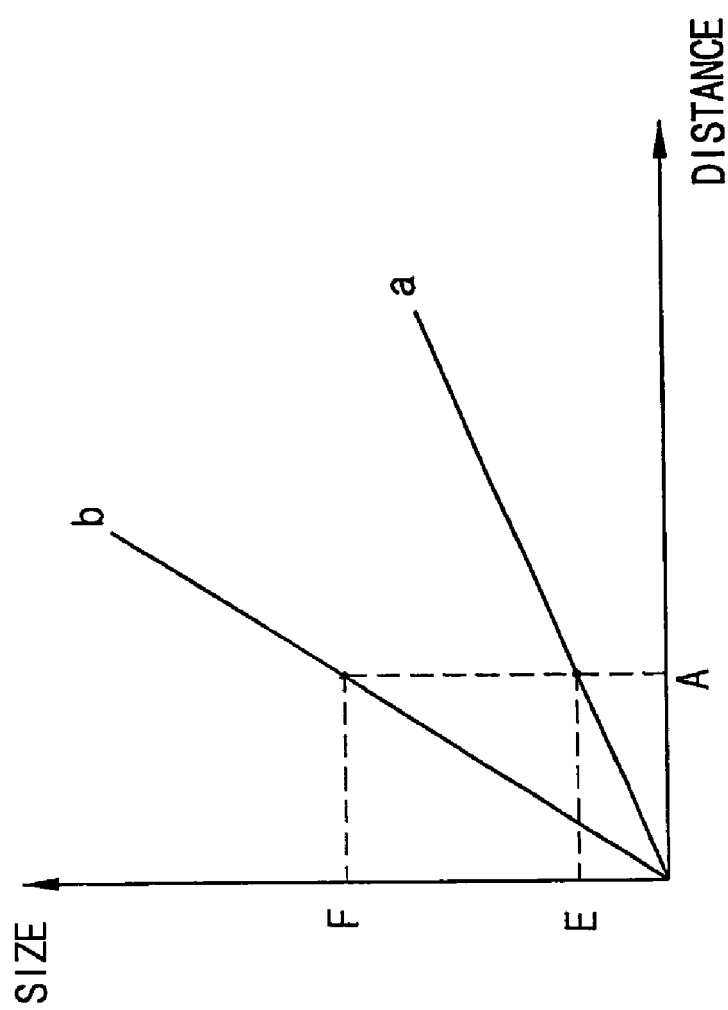
FIG. 17 is a graph showing differences of the size between a first light reflecting pad and a second light reflecting pad shown in FIG. 15.

FIG. 15 is a schematic diagram showing a backlight assembly 1000f for emitting a light in two directions according to a seventh embodiment of the present invention. FIG. 16 is a graph showing a size of the light reflecting pattern shown in FIG. 15. FIG. 17 is a graph showing differences of the size between a first light reflecting pad 721 and a second light reflecting pad 822 shown in FIG. 15.

Referring to FIG. 15, the first and second light guide plates 700*b* and 800*d* may be formed to have sizes different to each other. In FIG. 15, the first light guide plate 700*b* has a size greater than that of the second light guide plate 800*d*.

The first light guide plate 700*b* includes a first light reflecting pad 721 disposed on the first surface 720 thereof and the second light guide plate 800*d* includes a second light reflecting pad 822 disposed on the third surface 820 thereof. Where the size of the first light guide plate 700*b* is greater than that of the second light guide plate 800*d*, the first light reflecting pad 721 disposed on the first surface 720 has a pattern different to that of the second light reflecting pad 822 disposed on the third surface 820.

As shown in FIG. 16, sizes of the first and second light reflecting pads 721 and 822 become larger according as the first and second light reflecting pads 721 and 822 are spaced more apart from the first and second light incident surface 710 and 810, respectively. The size of the first light reflecting pad 721 is not same to that of the second light reflecting pad 822.

Referring to FIG. 17, a rate of change of the size of the second light reflecting pad 822 based on a distance between the second light incident surface 810 and the second light reflecting pad 822 is greater than that of the first light reflecting pad 721 based on a distance between the first light incident surface 710 and the first light reflecting pad 721. In FIG. 17, a graph indicated by a reference "a" shows the rate of change of the size of the first light reflecting pad 721 and a graph indicated by a reference "b" shows the rate of change of the size of the second light reflecting pad 822.

When the sizes of the first and second light reflecting pads 721 and 822 are measured at a position spaced apart from the first and second light incident surface 710 and 810 by a reference "A", the first light reflecting pad 721 has a size "E" and the second light reflecting pad 822 has a size "F" greater than the size "E".

Figure 18:
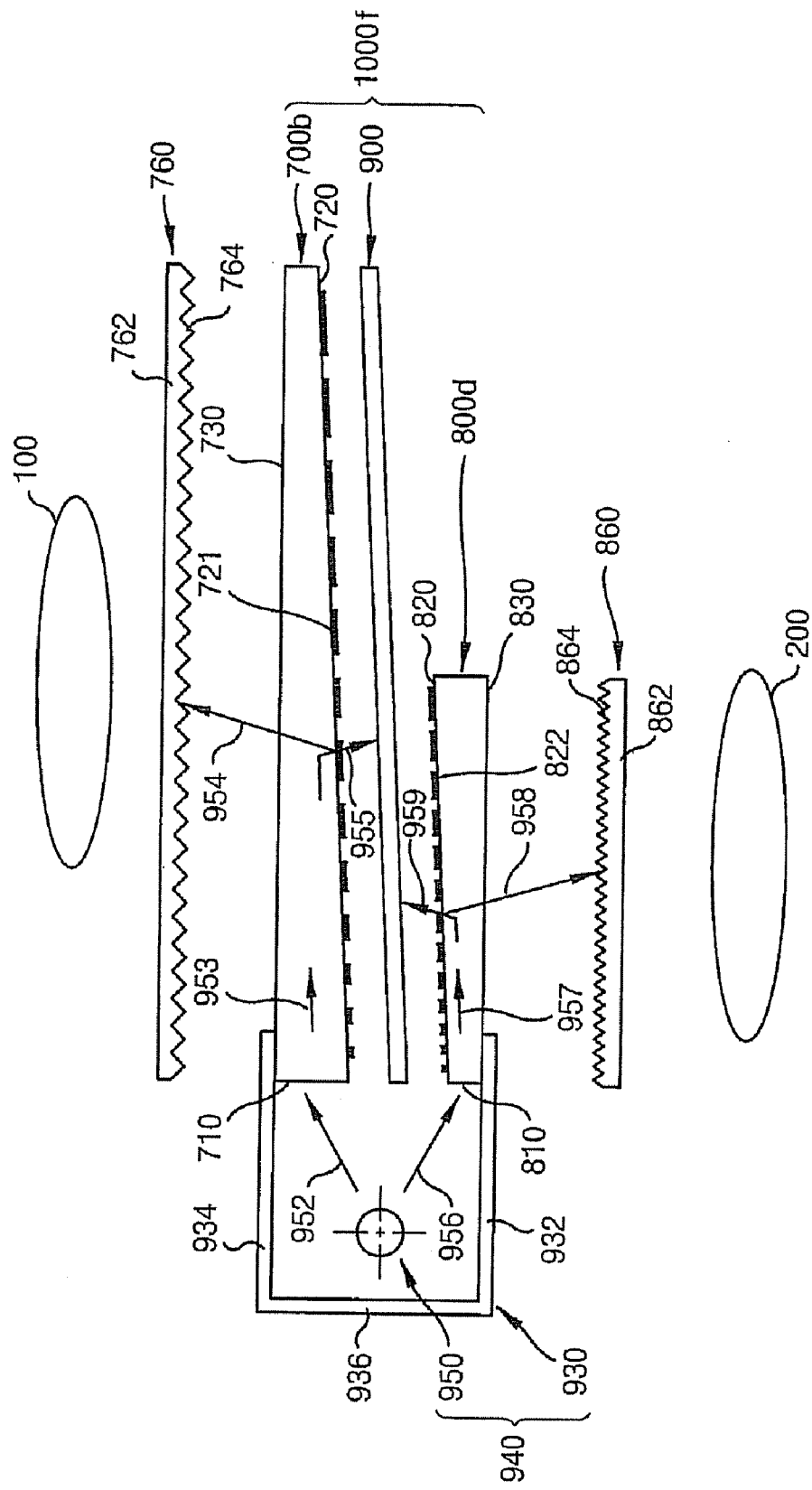
FIG. 18 is a schematic diagram showing a backlight assembly for emitting a light in two directions according to a eighth embodiment of the present invention.

FIG. 18 is a schematic diagram showing a backlight assembly 1000*f* for emitting a light in two directions according to an eighth embodiment of the present invention.

Referring to FIG. 18, the backlight assembly 1000*f* may further include a first optical sheet 760 and a second optical sheet 860.

The first optical sheet 760 is disposed between the first display area 100 and the first light guide plate 700*b* and faces the second surface 730.

The first optical sheet 760 includes a body portion 762 having a plate shape and a brightness enhancing portion 764 for enhancing the brightness, which is disposed on a surface facing to the first surface 720. The brightness enhancing portion 764 is successively disposed on the body portion 762 and protruded from the body portion 762 to have a triangle shape in section.

The second optical sheet 860 is disposed between the second display area 200 and the second light guide plate 800*d* and faces the fourth surface 830.

The second optical sheet 760 includes a body portion 762 having a plate shape and a brightness enhancing portion 764 for enhancing the brightness, which is disposed on a surface facing to the first surface 720. The brightness enhancing portion 764 is successively disposed on the body portion 762 and protruded from the body portion 762 to have a triangle shape in section.

Figure 19:
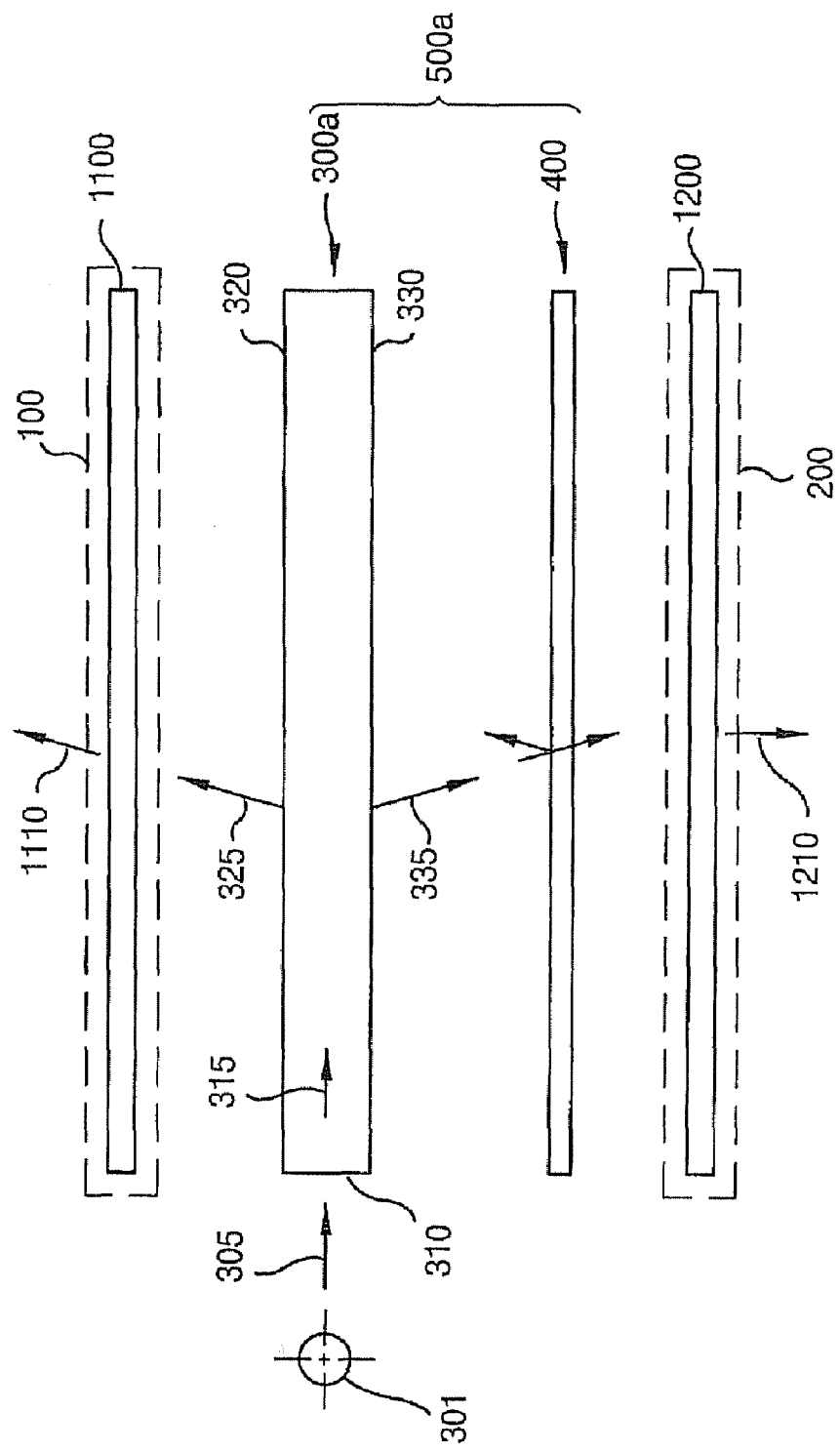
FIG. 19 is a schematic diagram showing an LCD apparatus according to a first embodiment of the present invention.

FIG. 19 is a schematic diagram showing an LCD apparatus according to a first embodiment of the present invention. FIGS. 20 to 23 are schematic diagrams showing sizes and locations of a first LCD panel assembly and a second LCD panel assembly shown in FIG. 19.

Referring to FIG. 19, an LCD apparatus 1300*a* includes a first LCD panel assembly 1100, a second LCD panel assembly 1200 and the backlight assembly 500*a* shown in FIG. 1.

The first LCD panel assembly 1100 is disposed on the first display area 100. The first LCD panel assembly 1100 receives the third light 325 emitted from the first light emitting surface 320 and the portion of the fourth light 335 reflected from the brightness control member 400 and emits a first display light 1110 having image information.

The second LCD panel assembly 1200 is disposed on the second display area 200. The second LCD panel assembly 1200 receives a light passed through the brightness control member 400 of the fourth light 335 emitted from the second light emitting surface 330 and emits a second display light 1210 having image information.

The first and second LCD panel assemblies 1100 and 1200 have a first display area and a second display area, respectively. The first and second display areas are same to each other.

Figure 20:
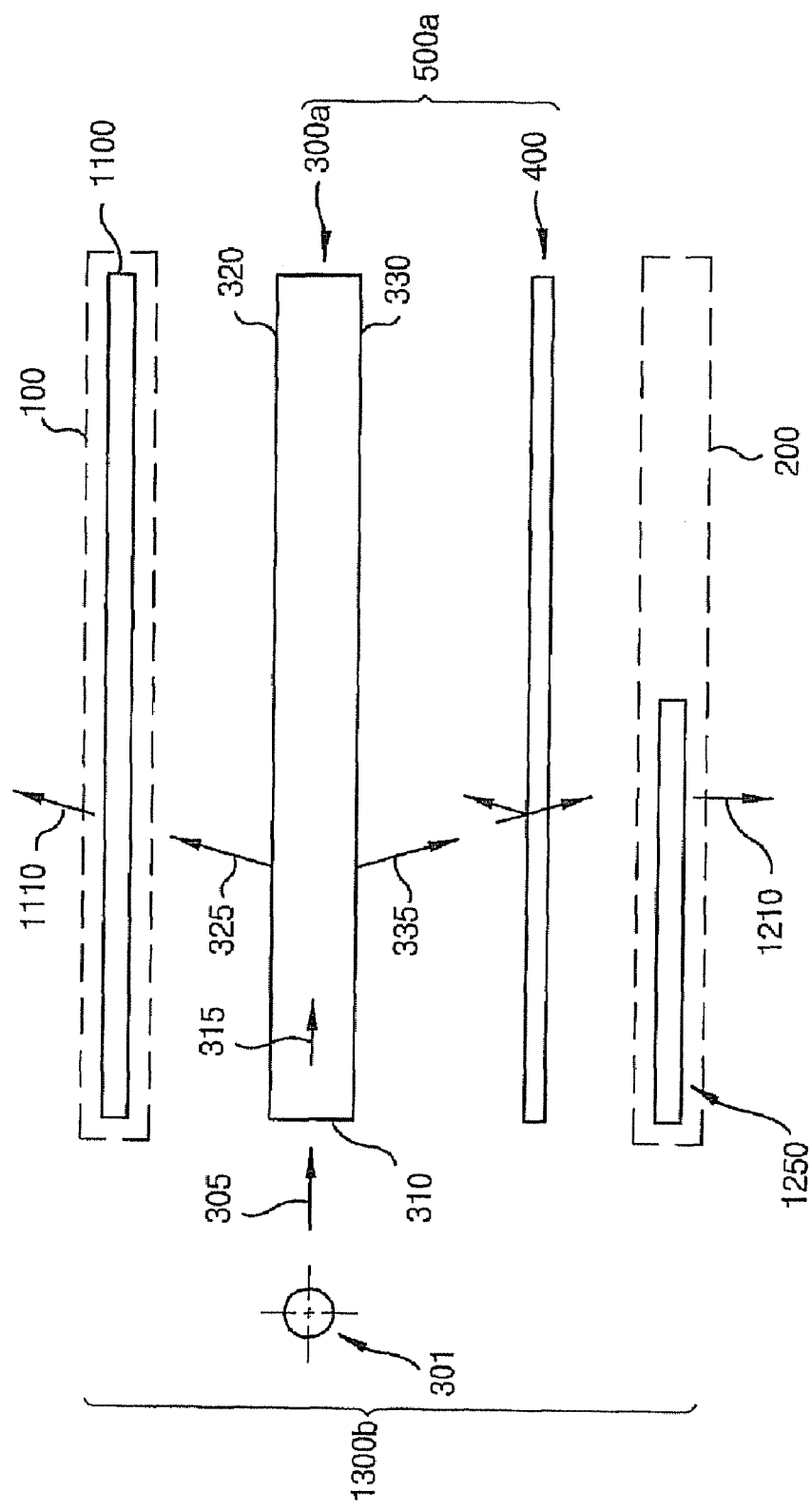
FIGS. 20 to 23 are schematic diagrams showing sizes and locations of a first LCD panel assembly and a second LCD panel assembly shown in FIG. 19.

Further, the first LCD panel assembly 1100 may have a first display area different to the second display area of a second LCD panel assembly 1250 as shown in FIG. 20.

Referring to FIG. 20, in an LCD apparatus 1300*b* the first display area of the first LCD panel assembly 1100 is greater than the second display area of the second LCD panel assembly 1250.

Where the second display area of the second LCD panel assembly 1250 is smaller than the first display area of the first LCD panel assembly 1100, a driving module may be disposed at a surplus space of the second LCD panel assembly 1250. Therefore, the volume of the second LCD panel assembly 1250 may be reduced.

As shown in FIG. 4, when the second light emitting surface 332 of the light guide plate 300 is inclined, the second LCD panel assembly 1250 may be disposed parallel to the second light emitting surface 332. Thus, it is able to reduce the thickness of the LCD apparatus in total.

Where the first LCD panel assembly 1100 is greater than the second LCD panel assembly 120, optical properties of the second LCD panel assembly 1250 depend on a position of the second LCD panel assembly 1250.

Figure 21:
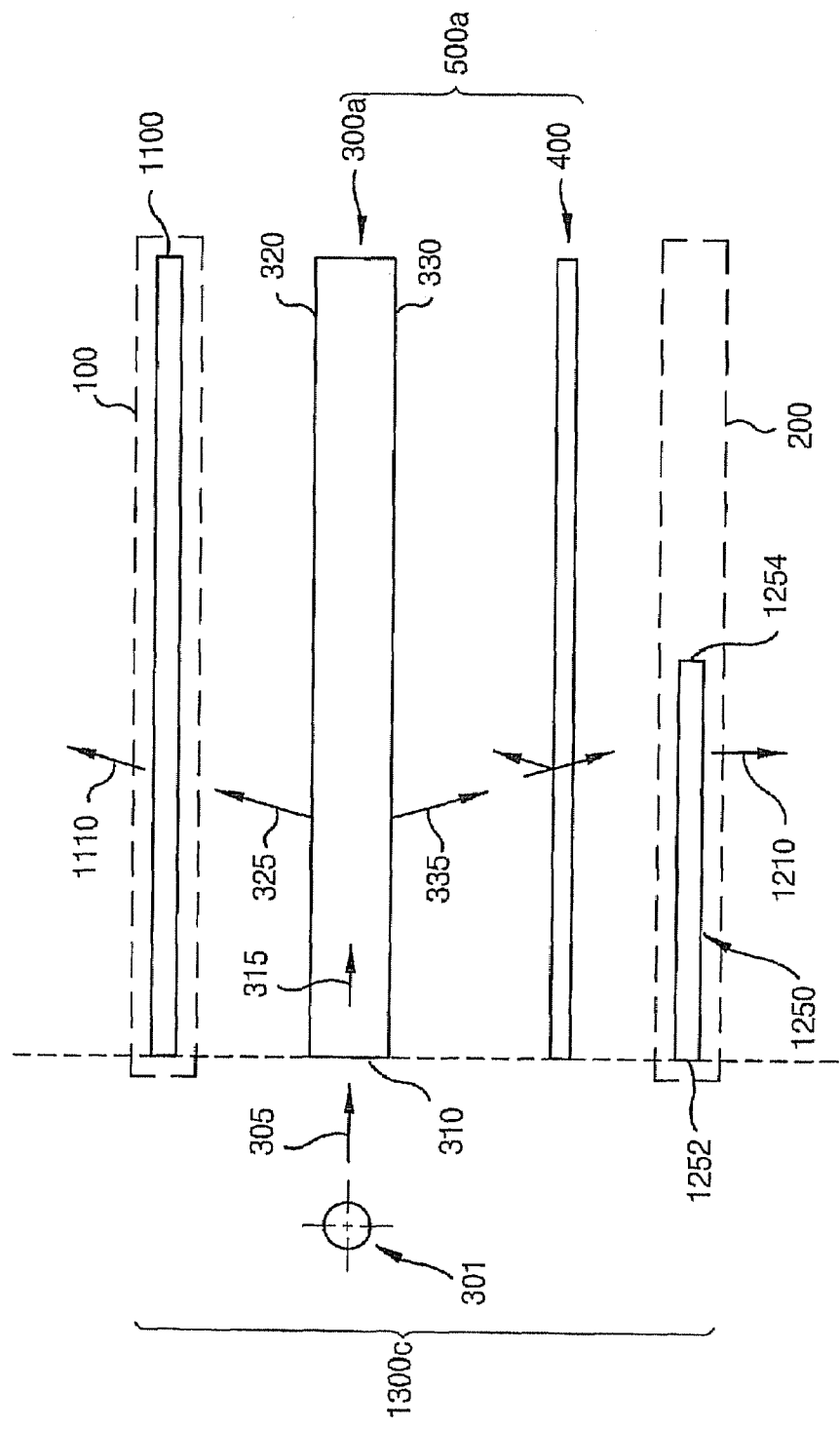

In FIG. 21, in an LCD apparatus 1300*c*, a reference numeral 1252 indicates a first end portion of the second LCD panel assembly 1250 and a reference numeral 1254 indicates a second end portion opposite to the first end portion.

Figure 22:
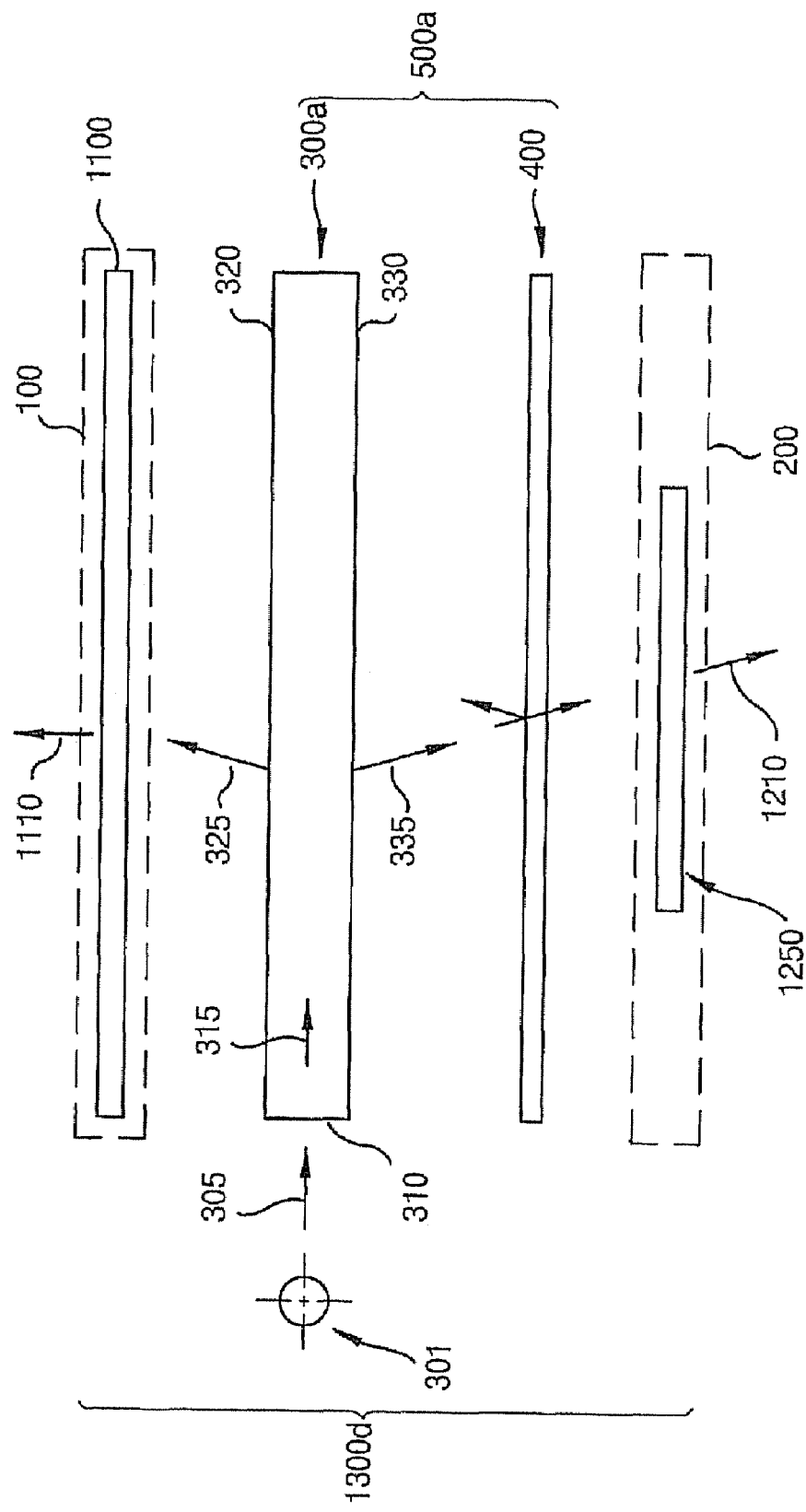
Figure 23:
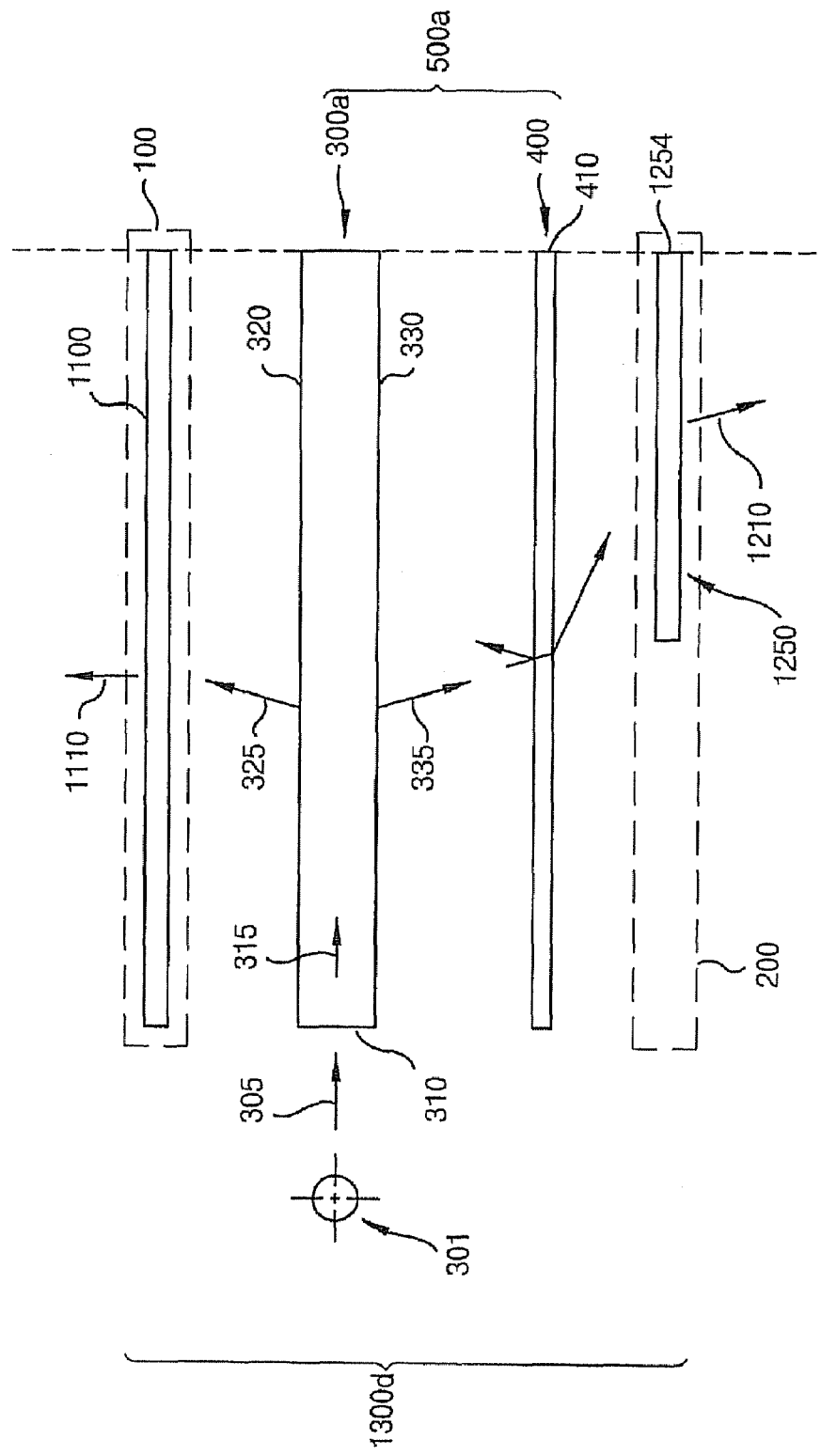

The first end portion 1252 of the second LCD panel assembly 1250 is aligned to the light incident surface 310 of the light guide plate 300. Where the first end portion 1252 is aligned to the light incident surface 310, the second LCD panel assembly 1250 may obtain a lot of light than where the first end portion 1252 is not aligned to the light incident surface 310. Also, as shown in FIG. 22, in an LCD apparatus 1300*d* the second LCD panel assembly 1250 may be disposed at a center portion with respect to the second light emitting surface 330. Further, as shown in FIG. 23, in an LCD apparatus 1300*e* the second end portion 1254 of the second LCD panel assembly 1250 may be aligned to an end portion 410 of the brightness control member 400.

Figure 24:
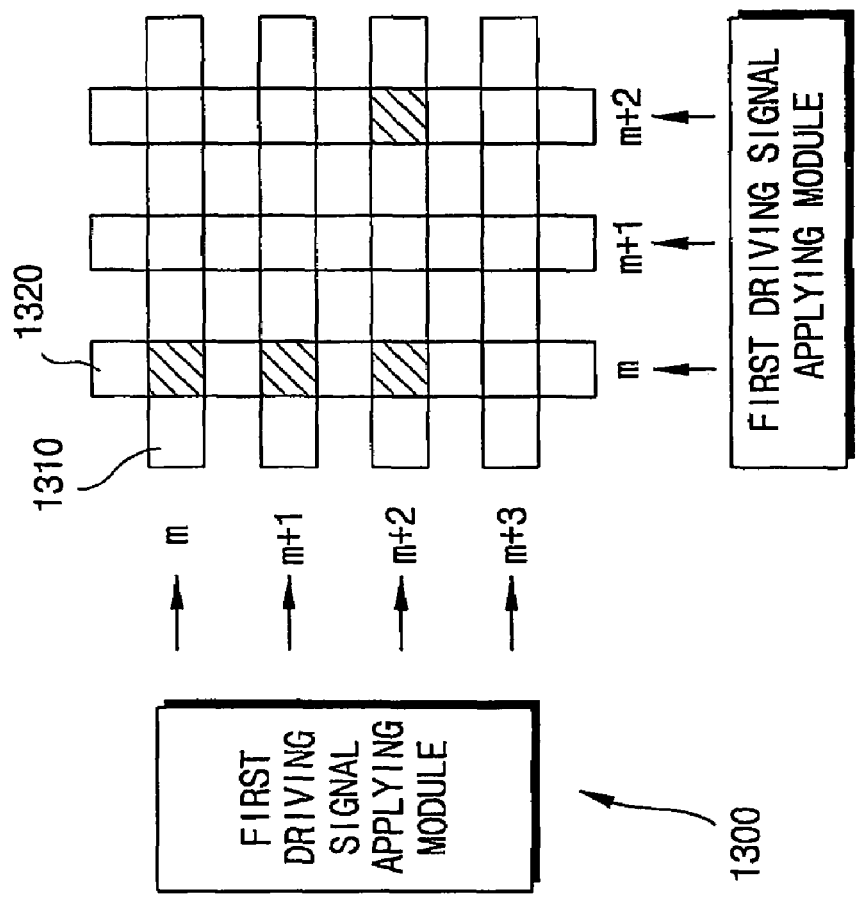
FIGS. 24 and 25 are schematic diagrams showing driving methods of the first and second LCD panel assemblies shown in FIG. 19.
Figure 25:
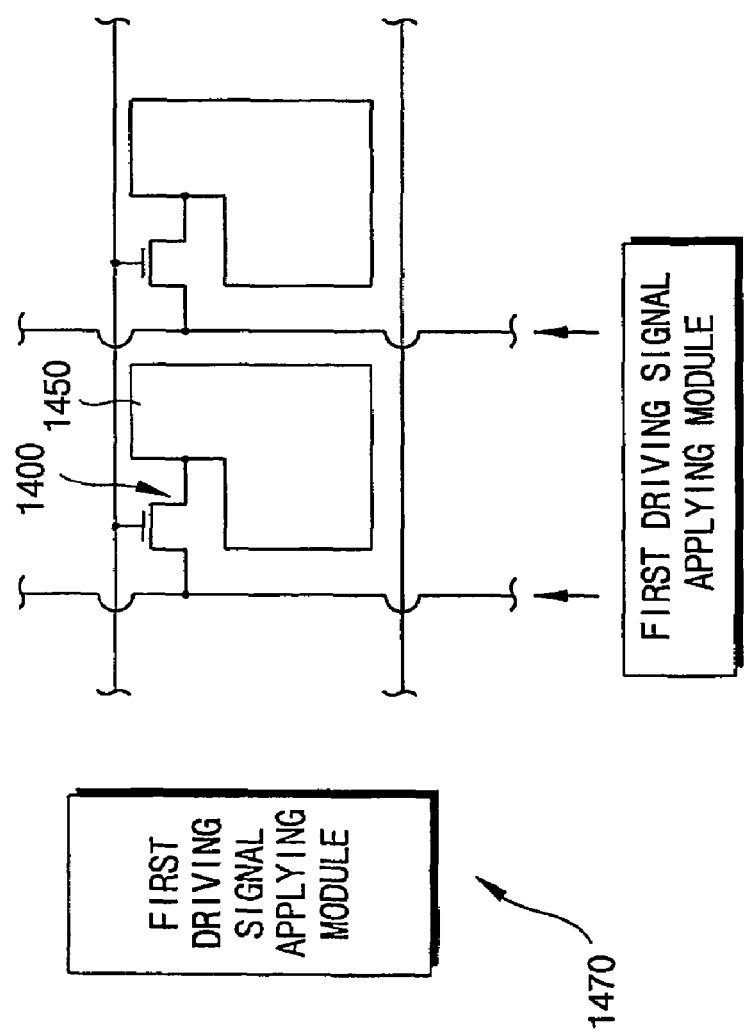

FIGS. 24 and 25 are schematic diagrams showing driving methods of the first and second LCD panel assemblies shown in FIG. 19.

Referring to FIG. 24, at least one of the first and second LCD panel assemblies 1100 and 1200 shown in FIG. 19 may be operated by a passive matrix method without using a thin film transistor. The passive matrix method is a manner that generates an electric field for controlling the liquid crystal using a driving signal applying part 1300 after injecting a liquid crystal between a first electrode 1310 and a second electrode 1320 intersected with the first electrode 1310.

Since the first LCD panel assembly 1100 is operated by the driving signal applying part 1300 same to that for operating the second LCD panel assembly 1200, the first LCD panel assembly 1100 displays an image same to that displayed through the second LCD panel assembly 1200.

On the contrary, the first and second LCD panel assemblies 1100 and 1200 may include a first driving module for generating a first driving signal and a second driving module for generating a second driving signal, respectively. In this case, the first LCD panel assembly 1100 displays a first image and the second LCD panel assembly 1200 displays a second image.

As shown in FIG. 25, at least one of the first and second LCD panel assemblies 1100 and 1200 shown in FIG. 19 may be operated by an active matrix method. The active matrix method is a manner that uses a thin film transistor 1400 and a pixel electrode 1450 receiving a power from the thin film transistor 1400 and generates an electric field for controlling the liquid crystal using a driving signal applying part 1470.

Since the first LCD panel assembly 1100 is operated by the driving signal applying part 1470 same to that for operating the second LCD panel assembly 1200, the first LCD panel assembly 1100 displays an image same to that displayed through the second LCD panel assembly 1200.

On the contrary, the first and second LCD panel assemblies 1100 and 1200 may include a first driving module for generating a first driving signal and a second driving module for generating a second driving signal, respectively. In this case, the first LCD panel assembly 1100 displays a first image and the second LCD panel assembly 1200 displays a second image.

Figure 26:
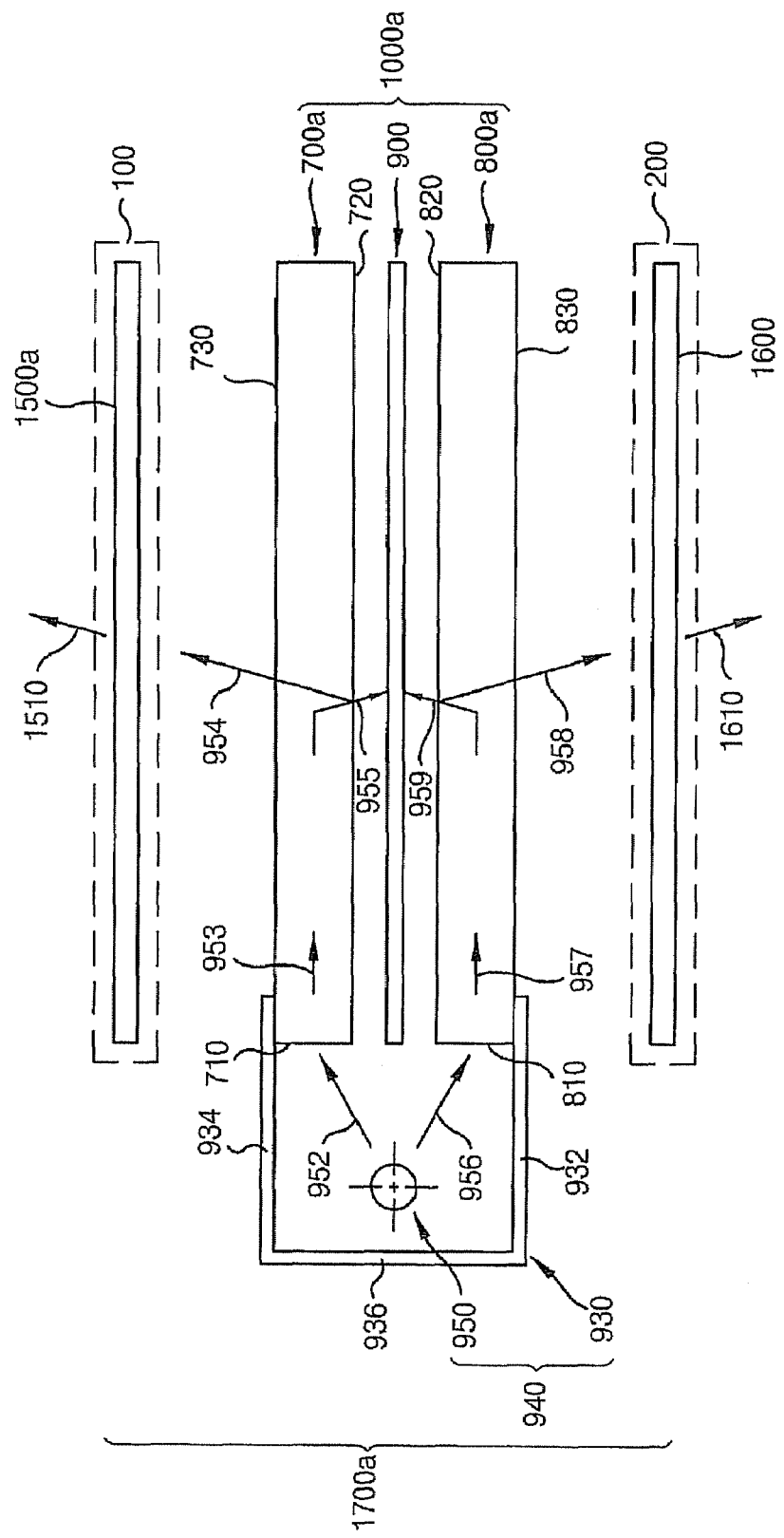
FIG. 26 is a schematic diagram showing an LCD apparatus according to a second embodiment of the present invention.
Figure 27:
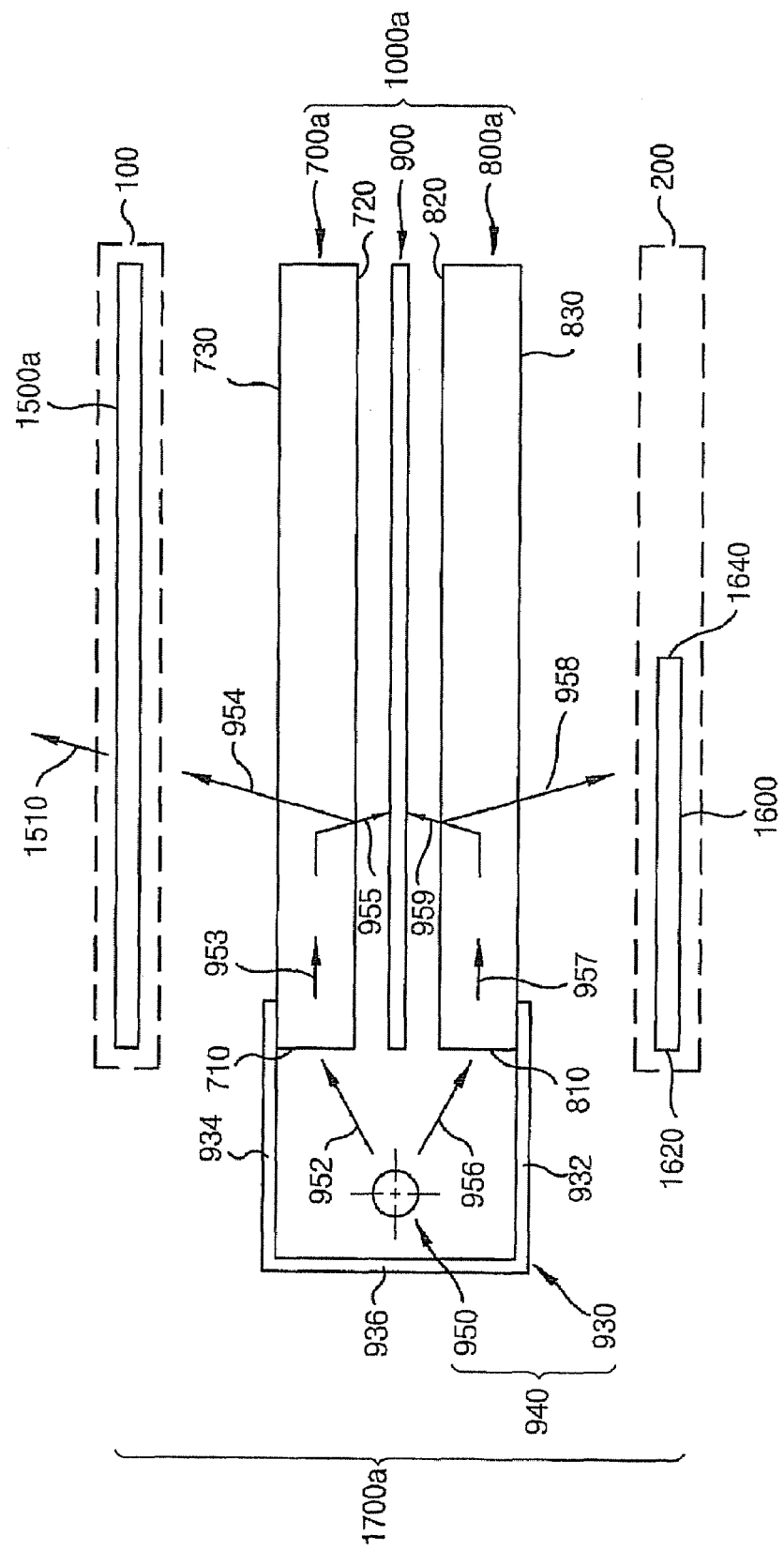
FIG. 27 is a schematic diagram showing sizes and locations of a first LCD panel assembly and a second LCD panel assembly shown in FIG. 26.

FIG. 26 is a schematic diagram showing an LCD apparatus according to a second embodiment of the present invention. FIG. 27 is a schematic diagram showing sizes and locations of a first LCD panel assembly and a second LCD panel assembly shown in FIG. 26.

Referring to FIG. 26, an LCD apparatus 1700a includes a first LCD panel assembly 1500, a second LCD panel assembly 1600 and the backlight assembly 1000a shown in FIG. 7.

The first LCD panel assembly 1500 is disposed on the first display area 100. The first LCD panel assembly 1500 receives the third light 954 emitted from the second surface 730 and the portion of the fourth light 955 reflected from the brightness control member 900 and emits a first display light 1510 having image information.

The second LCD panel assembly 1600 is disposed on the second display area 200. The second LCD panel assembly 1600 receives a light passed through the brightness control member 900 of the eighth light 959 emitted from the third surface 830 and emits a second display light 1610 having image information.

The first and second LCD panel assemblies 1500 and 1600 have a first display area and a second display area, respectively. The first and second display areas are same to each other.

Further, the first LCD panel assembly 1500 may have a first display area different to the second display area of a second LCD panel assembly 1600 as shown in FIG. 27.

Referring to FIG. 27, the first display area of the first LCD panel assembly 1500 is greater than the second display area of the second LCD panel assembly 1600. Where the first LCD panel assembly 1500 is greater than the second LCD panel assembly 1600, optical properties of the second LCD panel assembly 1600 depend on a position of the second LCD panel assembly 1600.

In FIG. 27, referring to an LCD apparatus 1700b, a reference numeral 1620 indicates a first end portion of the second LCD panel assembly 1600 and a reference numeral 1640 indicates a second end portion opposite to the first end portion.

The first end portion 1620 of the second LCD panel assembly 1600 is aligned to the light incident surface 810 of the second light guide plate 800a. Where the first end portion 1620 is aligned to the light incident surface 810, the second LCD panel assembly 1600 may obtain a lot of light than where the first end portion 1620 is not aligned to the light incident surface 810. Also, the second LCD panel assembly 1600 may be disposed at a center portion with respect to the second light emitting surface 830 as shown in FIG. 27. Further, the second end portion 1640 of the second LCD panel assembly 1600 may be aligned to an end portion 910 of the brightness control member 900.

At least one of the first and second LCD panel assemblies 1500 and 1600 shown in FIG. 26 may be operated by a passive matrix method without using a thin film transistor. The passive matrix method is a manner that generates an electric field for controlling the liquid crystal using a driving signal applying part 1300 after injecting a liquid crystal between a first electrode 1310 and a second electrode 1320 intersected with the first electrode 1310.

Since the first LCD panel assembly 1500 is operated by the driving signal applying part 1300 same to that for operating the second LCD panel assembly 1600, the first LCD panel assembly 1500 displays an image same to that displayed through the second LCD panel assembly 1600.

On the contrary, the first and second LCD panel assemblies 1500 and 1600 may include a first driving module for generating a first driving signal and a second driving module for generating a second driving signal, respectively. In this case, the first LCD panel assembly 1500 displays a first image and the second LCD panel assembly 1600 displays a second image.

At least one of the first and second LCD panel assemblies 1500 and 1600 shown in FIG. 26 may be operated by an active matrix method. The active matrix method is a manner that uses a thin film transistor 1400 and a pixel electrode 1450 receiving a power from the thin film transistor 1400 and generates an electric field for controlling the liquid crystal using a driving signal applying part 1470.

Since the first LCD panel assembly 1500 is operated by the driving signal applying part 1470 same to that for operating the second LCD panel assembly 1600, the first LCD panel assembly 1500 displays an image same to that displayed through the second LCD panel assembly 1600.

On the contrary, the first and second LCD panel assemblies 1500 and 1600 may include a first driving module for generating a first driving signal and a second driving module for generating a second driving signal, respectively. In this case, the first LCD panel assembly 1500 displays a first image and the second LCD panel assembly 1600 displays a second image.

According to the present invention, the LCD apparatus may display images in the two directions, which are same to each other or different to each other. Where the images are different to each other, the LCD apparatus may display the images to have a first and a second brightness that are different to each other, using the brightness control member. Thus, a user may obtain various images through the LCD apparatus.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

The invention claimed is:

1. A backlight assembly for emitting a light in two directions, comprising:
   a lamp assembly disposed between a first display area and a second display area, for providing a first light and a fifth light into a space between the first and second display areas, the first and fifth lights having a path different to each other;
   a first light guide plate having a first light incident surface for changing the first light into a second light, a first surface for reflecting a portion of the second light to the first display area as a third light and a second surface for emitting the third light, the second surface being faced to the first surface;
   a second light guide plate having a second light incident surface for changing the fifth light into a sixth light, a third surface for reflecting a portion of the sixth light to the second display area as a seventh light and a fourth surface for emitting the seventh light, the fourth surface being faced to the third surface; and
   a reflecting plate disposed between the first and third surfaces, reflecting a portion of the second light leaked from the first surface to the first display area as a fourth light and reflecting a portion of the sixth light leaked from the third surface to the second display area as an eighth light;
   wherein the first light guide plate has a thickness that becomes thicker as it is near to the first light incident surface, the second light guide plate has a thickness that becomes thinner as it is near to the second light incident surface and the second surface is parallel to the fourth surface.

2. The backlight assembly of claim 1, wherein the first and third surfaces comprise a first light reflecting pad and a second light reflecting pad having a dot shape, respectively, the first and second light reflecting pads become larger according as the first and second light reflecting pads are spaced more apart from the first and second light incident surface.

3. The backlight assembly of claim 1, wherein the first light guide plate has a plane size greater than that of the second light guide plate.

4. The backlight assembly of claim 3, wherein the first and third surfaces comprise a first light reflecting pad and a second light reflecting pad having a dot shape, respectively, the first and second light reflecting pads become larger according as the first and second light reflecting pads are spaced more apart from the first and second light incident surface, and a change rate of size of the second light reflecting pad is greater than that of the first light reflecting pad.

5. The backlight assembly of claim 1, further comprising a first optical sheet disposed at a place facing the second surface and a second optical sheet disposed at a place facing the fourth surface.

6. The backlight assembly of claim 5, wherein the first optical sheet comprises a first body portion having a plate shape and a first brightness enhancing protrusion portion protruded from the first body portion facing to the second surface to have a triangle shape in section, and the second optical sheet comprises a second body portion having a plate shape and a second brightness protrusion portion protruded from the second body portion facing to the fourth surface to have a triangle shape in section.

7. An LCD apparatus comprising:
   a lamp assembly disposed between a first display area and a second display area, for providing a first light into a space between the first and second display areas;
   a light guide plate having a light incident surface for changing the first light into a second light, a first light emitting surface for emitting a portion of the second light to the first display area as a third light and a second light emitting surface for emitting a remained portion of the second light to the second display area as a fourth light;
   a brightness control sheet for reflecting a portion of the fourth light to the first display area and transmitting a remained portion of the fourth light to the second display area, so that a first brightness at the first display area and a second brightness at the second display area have a predetermined brightness ratio, respectively;
   a first LCD panel assembly for changing the portions of the third and fourth lights into a first display light having an image information; and
   a second LCD panel assembly for changing the remained portion of the fourth light into a second display light having an image information.

8. The LCD apparatus of claim 7, wherein the first LCD panel assembly has a first display area same to a second display area of the second LCD panel assembly.

9. The LCD apparatus of claim 7, wherein at least one of the first and second LCD panel assemblies further comprise an active matrix LCD panel having a thin film transistor.

10. The LCD apparatus of claim 7, wherein at least one of the first and second LCD panel assemblies further comprise a passive matrix LCD panel.

11. The LCD apparatus of claim 7, wherein the first and second LCD panel assemblies further comprise a driving module for displaying image information in response to a driving signal, respectively.

12. The LCD apparatus of claim 7, wherein the first LCD panel assembly further comprises a first driving module for displaying a first information in response to a first driving signal and the second LCD panel assembly further comprises a second driving module for displaying a second information in response to a second driving signal.

13. The LCD apparatus of claim 7, wherein the brightness control sheet comprises a sheet for reflecting and transmitting a light.

14. The LCD apparatus of claim 7, wherein the first LCD panel assembly has a first display area greater than a second display area of the second LCD panel assembly.

15. The LCD apparatus of claim 14, wherein a first end portion of the second LCD panel assembly is aligned to the light incident surface of the second light emitting surface of the light guide plate.

16. The LCD apparatus of claim 14, wherein the second LCD panel assembly is disposed at a center portion of the second light emitting surface of the light guide plate.

17. The LCD apparatus of claim 14, wherein a second end portion of the second LCD panel assembly is aligned to a side portion opposite to the light incident surface of the second light emitting surface of the light guide plate.

18. An LCD apparatus comprising:
   a lamp assembly disposed between a first display area and a second display area, for providing a first light and a fifth lights into a space between the first and second display areas, the first and fifth lights having a path different to each other;

a first light guide plate having a first light incident surface for changing the first into a second light, a first surface for reflecting a portion of the second light to the first display area as a third light and transmitting a remained portion of the second light to the second display area as a fourth light, and a second surface facing to the first surface, for emitting the third light;

a second light guide plate having a second light incident surface for changing the fifth light into a sixth light, a third surface for reflecting a portion of the sixth light to the second display area as a seventh light and transmitting a remained portion of the sixth light to the first display area as a eighth light, and a fourth surface facing to the third surface, for emitting the seventh light;

a reflecting plate disposed between the first and third surfaces, for reflecting a remained portion of the second light leaked from the first surface to the first display area as a fourth light and reflecting a remained portion of the fifth light leaked from the third surface to the second display area as an eighth light;

a first LCD panel assembly for generating a first display light having an image information using the third and fourth lights; and a second LCD panel assembly for generating a second display light having an image information using the seventh and eight lights.

19. The LCD apparatus of claim 18, wherein the first LCD panel assembly has a first display area same to a second display area of the second LCD panel assembly.

20. The LCD apparatus of claim 18, wherein the first LCD panel assembly has a first display area greater than a second display area of the second LCD panel assembly.

21. The LCD apparatus of claim 18, wherein a first end portion of the second LCD panel assembly is aligned to the light incident surface of the light guide plate.

22. The LCD apparatus of claim 18, wherein at least one of the first and second LCD panel assemblies further comprises an active matrix LCD panel having a thin film transistor.

23. The LCD apparatus of claim 18, wherein at least one of the first and second LCD panel assemblies further comprises a passive matrix LCD panel.

24. The LCD apparatus of claim 18, wherein the first and second LCD panel assemblies further comprise a driving module for displaying an image information in response to a driving signal, respectively.

25. The LCD apparatus of claim 18, wherein the first LCD panel assembly further comprises a first driving module for displaying a first information in response to a first driving signal and the second LCD panel assembly further comprises a second driving module for displaying a second information in response to a second driving signal.

26. The LCD apparatus of claim 18, wherein the lamp assembly comprises:
   a lamp for generating light in a radial shape; and
   a lamp reflector for changing the light from the lamp into the first and fifth lights, the lamp reflector being fixed to the second and fourth surfaces while receiving the lamp therein.

* * * * *